(12) United States Patent
Omori et al.

(10) Patent No.: US 8,976,426 B2
(45) Date of Patent: Mar. 10, 2015

(54) LIGHT SOURCE DRIVING CIRCUIT, OPTICAL SCANNING DEVICE, AND IMAGE FORMING APPARATUS

(71) Applicants: Atsufumi Omori, Kanagawa (JP); Muneaki Iwata, Kanagawa (JP); Hayato Fujita, Kanagawa (JP)

(72) Inventors: Atsufumi Omori, Kanagawa (JP); Muneaki Iwata, Kanagawa (JP); Hayato Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/262,902

(22) Filed: Apr. 28, 2014

(65) Prior Publication Data
US 2014/0347708 A1    Nov. 27, 2014

(30) Foreign Application Priority Data
May 21, 2013    (JP) ................. 2013-107034

(51) Int. Cl.
H04N 1/04    (2006.01)
H04N 1/00    (2006.01)
H04N 1/113    (2006.01)

(52) U.S. Cl.
CPC ........... *H04N 1/00819* (2013.01); *H04N 1/113* (2013.01); *H04N 2201/0458* (2013.01)
USPC ............ 358/475; 358/474; 358/482; 358/497

(58) Field of Classification Search
USPC .......................... 358/475, 474, 482, 497, 498
See application file for complete search history.

(56) References Cited

U.S. PATENT DOCUMENTS

| | | | |
|---|---|---|---|
| 6,222,862 B1 * | 4/2001 | Kinbara et al. | ............ 372/38.04 |
| 6,791,596 B2 | 9/2004 | Nihei et al. | |
| 6,954,415 B2 | 10/2005 | Masui et al. | |
| 7,327,379 B2 | 2/2008 | Nihei et al. | |
| 7,463,278 B2 | 12/2008 | Ozasa et al. | |
| 7,496,121 B2 | 2/2009 | Ishida et al. | |
| 7,515,170 B2 | 4/2009 | Omori et al. | |
| 7,701,480 B2 | 4/2010 | Omori et al. | |
| 7,920,305 B2 | 4/2011 | Ishida et al. | |

(Continued)

FOREIGN PATENT DOCUMENTS

| | | |
|---|---|---|
| JP | 4476568 | 6/2010 |
| JP | 2011-198877 | 10/2011 |
| JP | 5013206 | 8/2012 |

OTHER PUBLICATIONS

U.S. Appl. No. 14/072,946, filed Nov. 6, 2013.

(Continued)

*Primary Examiner* — Houshang Safaipour
(74) *Attorney, Agent, or Firm* — Oblon, McClelland, Maier & Neustadt, L.L.P.

(57) ABSTRACT

A light source driving circuit that drives a light source includes a driving electric current generator that generates a driving electric current including a predetermined electric current, a first auxiliary current, and a second auxiliary current; and a controller that sets values of the first and second auxiliary currents by using first and second lighting pattern signals, wherein each of the first and second lighting pattern signals is for controlling supply of the predetermined electric current to the light source. After setting a first value of the first auxiliary current, a second value of the second auxiliary current is set by using the second lighting pattern signal that defines a time period for stopping supply of the predetermined electric current to be shorter than a time period for stopping the supply of the predetermined electric current that is defined by the first lighting pattern signal.

9 Claims, 14 Drawing Sheets

(56) References Cited

U.S. PATENT DOCUMENTS

| | | |
|---|---|---|
| 7,936,493 B2 | 5/2011 | Ishida et al. |
| 7,995,251 B2 | 8/2011 | Tanabe et al. |
| 8,089,665 B2 | 1/2012 | Omori et al. |
| 8,207,996 B2 | 6/2012 | Miyake et al. |
| 8,237,760 B2 | 8/2012 | Nihei et al. |
| 8,253,768 B2 | 8/2012 | Ishida et al. |
| 8,300,075 B2 | 10/2012 | Ishida et al. |
| 8,310,513 B2 | 11/2012 | Nihei et al. |
| 8,310,516 B2 | 11/2012 | Tanabe et al. |
| 8,576,887 B2 | 11/2013 | Furuse et al. |
| 8,610,971 B2 | 12/2013 | Omori et al. |
| 8,648,892 B2 | 2/2014 | Suzuki et al. |
| 8,654,168 B2 | 2/2014 | Akatsu et al. |
| 8,687,036 B2 | 4/2014 | Ishida et al. |
| 2005/0089069 A1 | 4/2005 | Ozasa et al. |
| 2008/0291259 A1 | 11/2008 | Nihei et al. |
| 2011/0199657 A1 | 8/2011 | Ishida et al. |
| 2011/0228037 A1 | 9/2011 | Omori et al. |
| 2012/0293783 A1 | 11/2012 | Ishida et al. |
| 2013/0243459 A1 | 9/2013 | Omori et al. |
| 2013/0302052 A1 | 11/2013 | Iwata et al. |

OTHER PUBLICATIONS

U.S. Appl. No. 14/082,628, filed Nov. 18, 2013.
U.S. Appl. No. 14/140,147, filed Dec. 24, 2013.
U.S. Appl. No. 14/334,617, filed Feb. 28, 2014.

\* cited by examiner

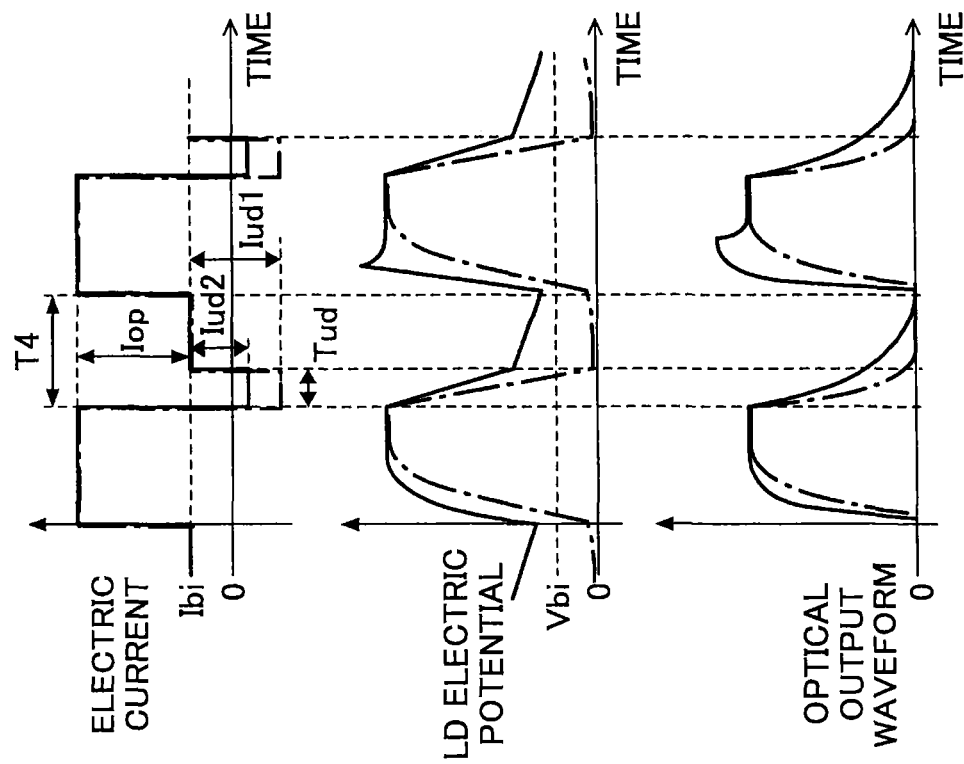
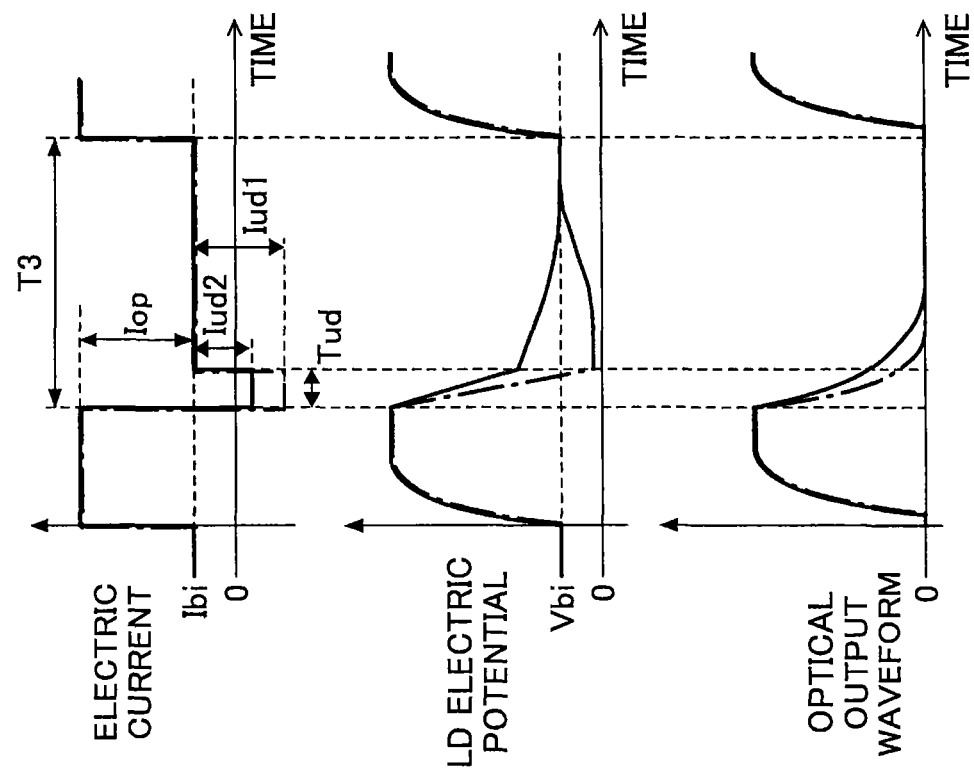

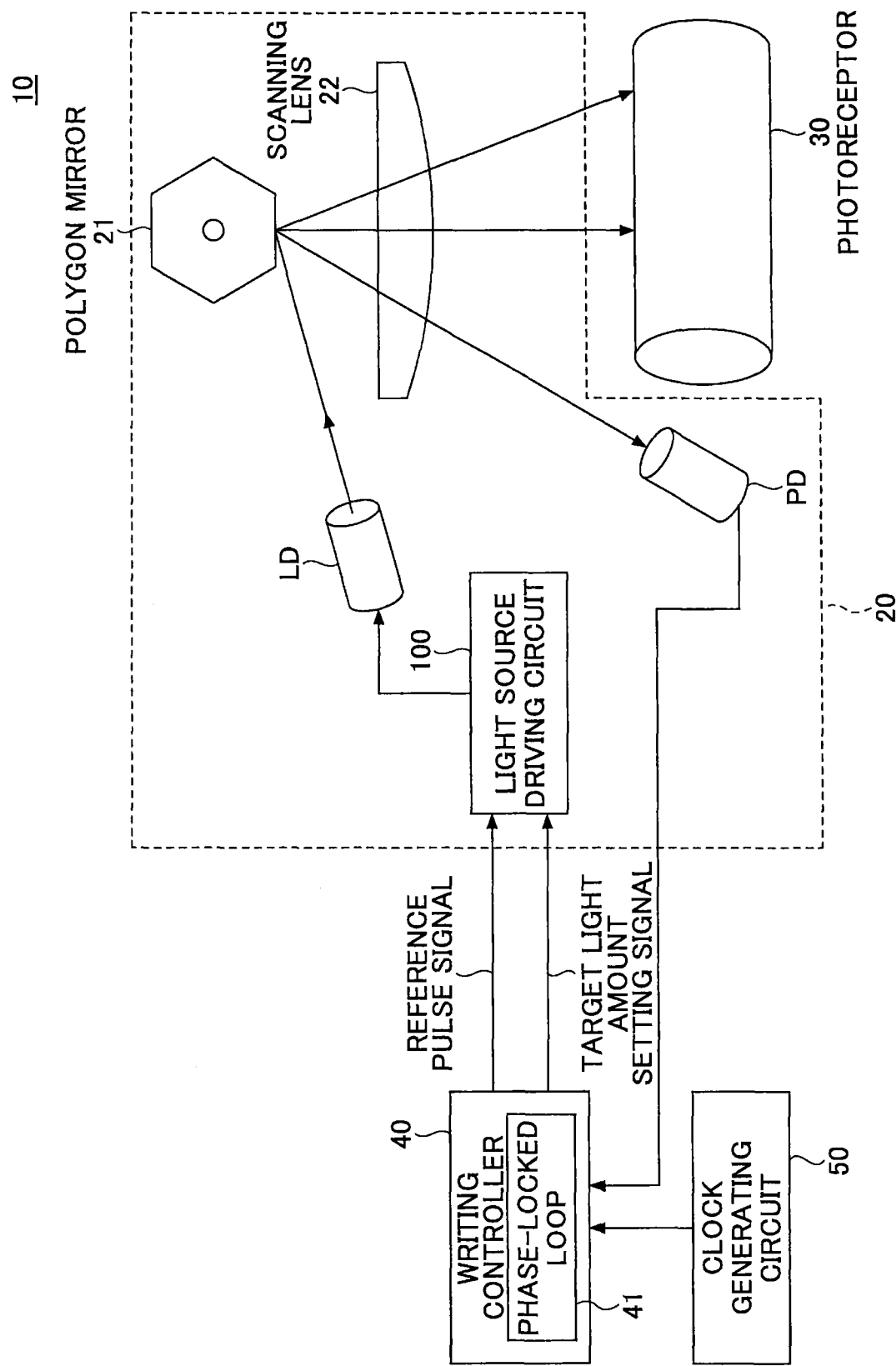

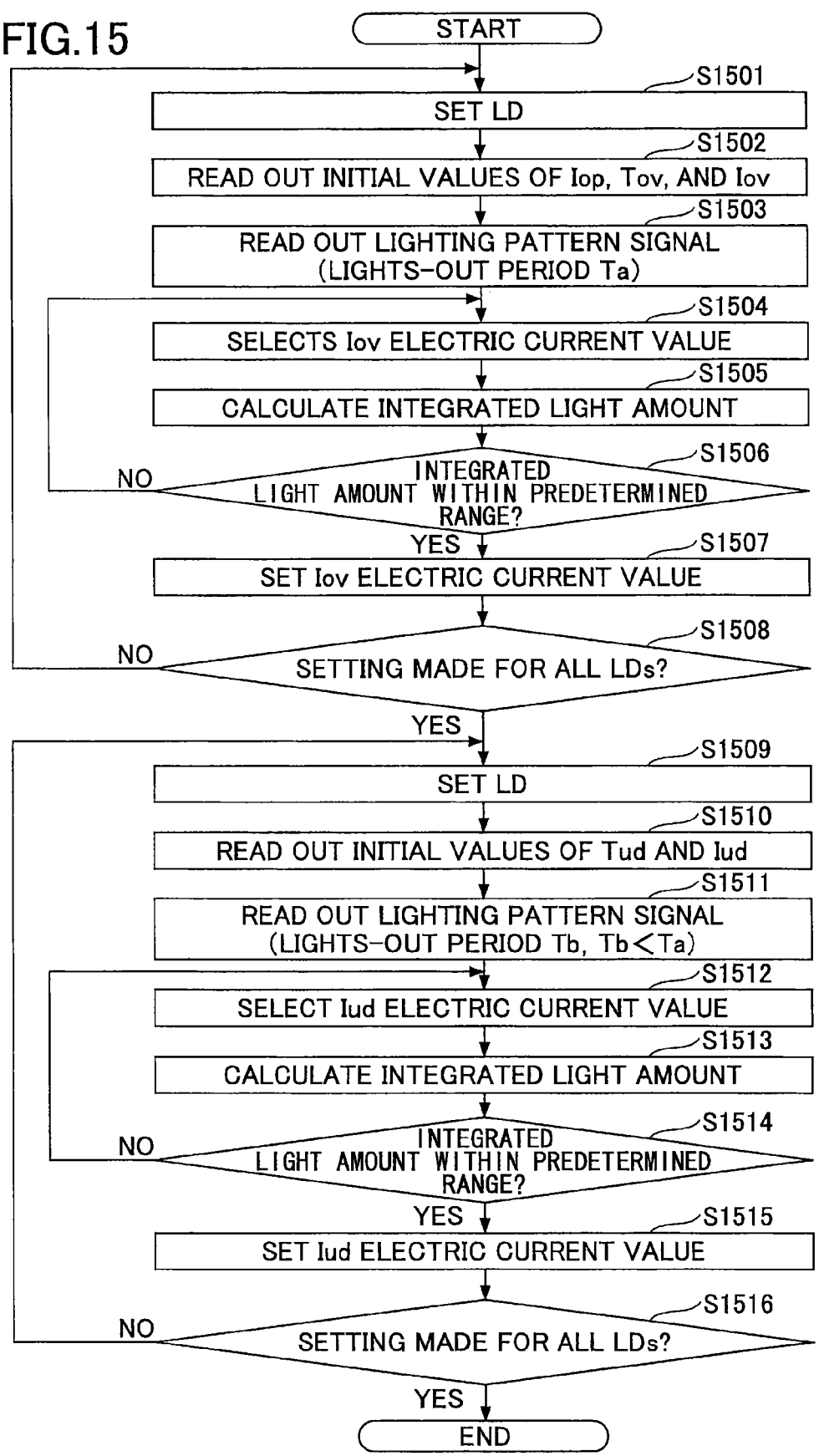

LIGHT SOURCE DRIVING CIRCUIT, OPTICAL SCANNING DEVICE, AND IMAGE FORMING APPARATUS

BACKGROUND OF THE INVENTION

1. Field of the Invention

The present invention relates to a light source driving circuit for driving a light source, an optical scanning device that includes the light source driving circuit, and an image forming apparatus that includes the light source driving circuit.

2. Description of the Related Art

In an image forming apparatus according to related art, predetermined optical output is gained from a light source, such as a laser diode (LD), and density of an image is expressed by exposing a photoreceptor.

It is known that, until a predetermined level of optical output is achieved from a light source, a certain time period may be elapsed (i.e., an emission delay time may occur) depending on response characteristics of the light source. It is also known that, from the start of supplying a predetermined electric current to a light source until detection of a predetermined level of optical output, an emission delay time may occur that depends on a parasitic capacitance of a circuit in which a light source is implemented.

Consequently, for an image forming apparatus according to related art, for example, when a time period for outputting light is a short time period that is shorter than several nanoseconds, a rising edge of an optical output waveform may be rounded due to an effect of the emission delay time and so forth. Accordingly, a predetermined light amount may not be achieved within such a short time period. It is known that, similar to the case of the rising edge, a falling edge of the waveform may be rounded at a moment of stopping supply of a predetermined electric current to a light source. The rounding of the falling edge of the light output waveform may be caused by a time spent for electric potential of a light source to transition from electric potential corresponding to a state where the light source is turned on to electric potential corresponding to a state where the light source is turned off.

Many attempts have been made to overcome such a situation. For example, Patent Document 1 (Japanese Unexamined Patent Publication No. 2011-198877) discloses that an overshoot is provided during a time period of rising to a predetermined electric current level, and an undershoot is provided to a time period of falling. Further, Patent Document 2 (Japanese Patent No. 4476568) discloses that an overshoot electric current and/or undershoot electric current is adjusted depending on a bias current and a switching current.

SUMMARY OF THE INVENTION

When a time period in which supply of a predetermined electric current stopped is a short time period, for example, a time period for a light source to transition from a state where the light source is turned on to a state where the light source is turned off may be a short time. In this case, the predetermined electric current may be supplied to the light source again prior to the electric potential of the light source reaching the electric potential corresponding to the state where the light source is turned off. Accordingly, it may be difficult to obtain a desired optical output waveform.

There is a need for a light source driving circuit, an optical scanning device, and an image forming apparatus that can achieve a desired optical output waveform, regardless of a timing of supplying or not supplying a predetermined electric current.

According to an aspect of the present invention, there is provided a light source driving circuit configured to drive a light source, the light source driving circuit including a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current; and a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source, wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

According to another aspect of the present invention, there is provided an optical scanning device including a light source; a reflection mirror configured to scan a light beam emitted from the light source; and a light source driving circuit configured to drive the light source, wherein the light source driving circuit includes a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current, and a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source, wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

According to another aspect of the present invention, there is provided an image forming apparatus including a light source; a reflection mirror configured to reflect a light beam emitted from the light source; a photoreceptor configured to be scanned by the light beam reflected by the reflection mirror, and a light source driving circuit configured to drive the light source, wherein the light source driving circuit includes a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current, and a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source, wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

According to the embodiment of the present invention, a predetermined optical output waveform can be obtained regardless of the timing of supplying or not supplying of a predetermined electric current.

Other objects, features and advantages of the present invention will become more apparent from the following detailed description when read in conjunction with the accompanying drawings.

BRIEF DESCRIPTION OF THE DRAWINGS

FIGS. 4A and 4B are diagrams showing an example of a waveform of a driving electric current and optical output waveform when an undershoot electric current is applied to a predetermined electric current;

FIG. 5 is a diagram illustrating an outline of an example of a configuration of an image forming apparatus;

FIG. 15 is a flowchart illustrating another example of an operation of the CPU.

DETAILED DESCRIPTION OF THE PREFERRED EMBODIMENTS

Hereinafter, an embodiment of the present invention is explained by referring to the accompanying drawings.

Figure 1:
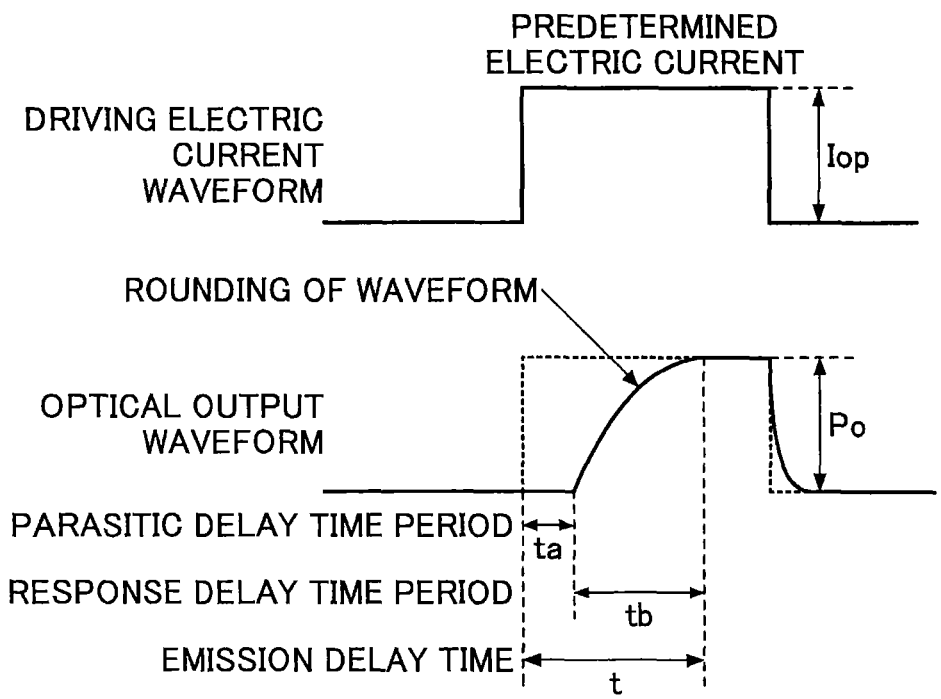
FIG. 1 is a diagram illustrating an example of an emission delay time of a light source.

FIG. 1 is a diagram illustrating an example of an emission delay time of a light source. FIG. 1 shows a waveform of a driving electric current supplied to the light source, and an optical output waveform of the light source to which the driving electric current is supplied. In FIG. 1, it is assumed that the output of the light source is indicated by a light amount.

The emission delay time t shown in FIG. 1 depicts a time period from the start of supplying the driving electric current to the light source, until the light source outputs a predetermined light amount Po. The predetermined light amount Po is a target light amount that is defined in advance. The emission delay time t is a sum of a parasitic delay time period "ta" and a response delay time period "tb." The parasitic delay time period "ta" is a time period for charging parasitic capacitance that occurs in parallel with the light source. The parasitic capacitance exists in a wireline connecting the light source and a circuit, a wireline within a package of the light source, and so forth. As the parasitic capacitance becomes larger, an amount of charge and a charging time period increase. Accordingly, the parasitic delay time period "ta" tends to increase as the parasitic capacitance becomes greater. Details of the parasitic capacitance "ta" is explained below.

The response delay time period "tb" is a response time from the start of emission of light from the light source in response to supply of a predetermined electric current Iop to the light source, until the light source outputs the predetermined light amount Po. The predetermined electric current Iop is a value of the electric current that is adjusted in advance, in order to obtain the predetermined light amount Po. The response delay time "tb" is caused by the characteristics of the light source. For example, the response delay time "tb" may be affected by differential resistance. As the differential resistance increases, the electric current may be prevented from flowing. Accordingly, the response delay time "tb" increases, as the differential resistance increases.

Actually, the emission delay time until the driving electric current is supplied to the light source includes a wiring delay time on a circuit substrate, beside the parasitic delay time and the response delay time. In the description of this specification, however, the wiring delay time is ignored. It is assumed that the emission delay time is the sum of the parasitic delay time and the response delay time. Further, in the description of this specification, a state is shown in which the falling edge of the driving electric current waveform is aligned with the falling edge of the optical output waveform.

Figure 2:
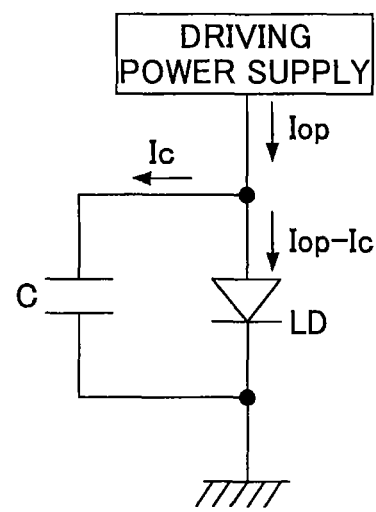
FIG. 2 is a diagram illustrating an example of parasitic capacitance.

Hereinafter, the parasitic capacitance is explained by referring to FIG. 2. FIG. 2 is a diagram illustrating the parasitic capacitance of the light source.

In this example, the light source is assumed to be a laser diode (LD). When a predetermined electric current Iop is supplied, the LD depicted in FIG. 2 outputs the predetermined light amount Po. In FIG. 2, "C" denotes the parasitic capacitance. The parasitic capacitance "C" includes parasitic capacitance that occurs in a wiring that connects the LD and a circuit, such as a driver of the LD, for example, for a case where the LD is implemented in a circuit substrate together with the circuit. When the LD and the circuit, such as the LD driver, are packaged, the parasitic capacitance "C" includes parasitic capacitance of the package and the like.

When the predetermined electric current Iop is supplied to the LD, a part of the electric current Iop, which is an electric current Ic, is supplied to the parasitic capacitance "C," thereby charging the parasitic capacitance "C." During charging of the parasitic capacitance "C" by the predetermined electric current Iop, a part of the predetermined electric current Iop, which is (Iop−Ic), is supplied to the LD. When charging of the parasitic capacitance "C" is completed, the predetermined electric current Iop is supplied to the LD. Namely, during charging of the parasitic capacity "C" by the electric current Ic, only a part of the predetermined electric current, which is (Iop−Ic), is supplied to the LD. Consequently, during charging of the parasitic capacity "C," optical output may not be obtained. This time period in which the optical output may not be obtained is the parasitic delay time.

The emission delay time t can be reduced by applying an overshoot electric current Iov that is synchronized with the rising edge of the predetermined electric current Iop. The overshoot electric current Iov is determined based on the response delay time that is obtained by the characteristics of the light source and the parasitic capacitance "C." Details of the determination of the overshoot electric current Iov are explained below.

Figure 3A:
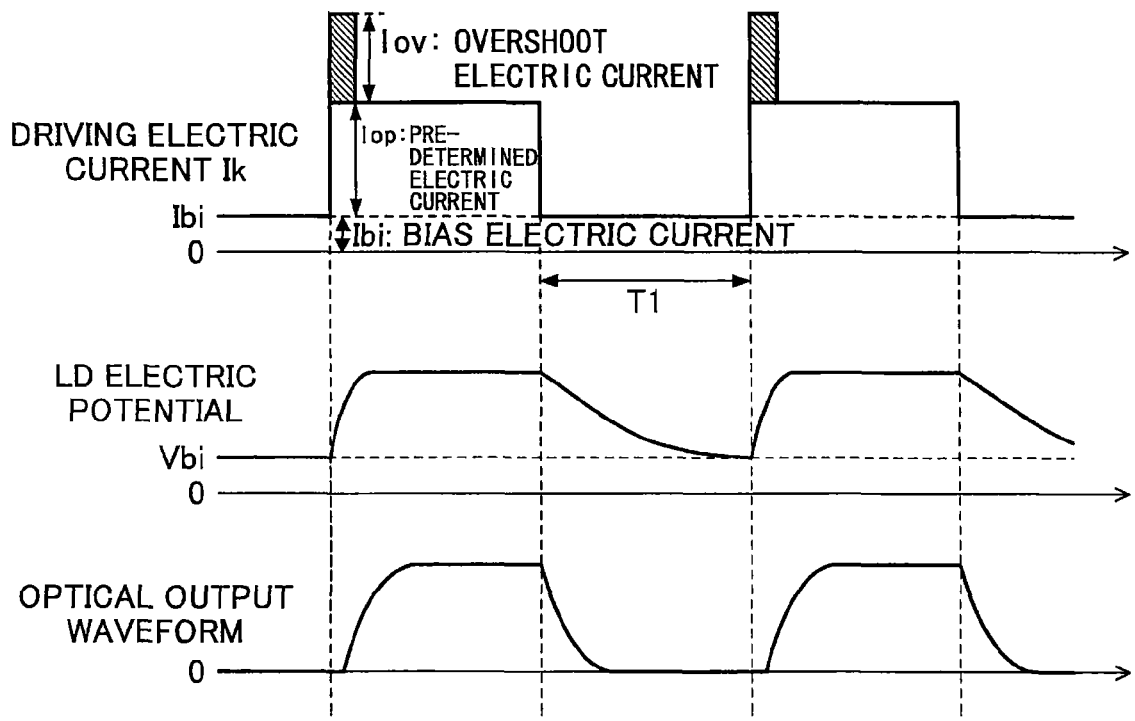
FIGS. 3A and 3B are diagrams showing an example of a waveform of a driving electric current and optical output waveform when an overshoot electric current is applied to a predetermined electric current.
Figure 3B:
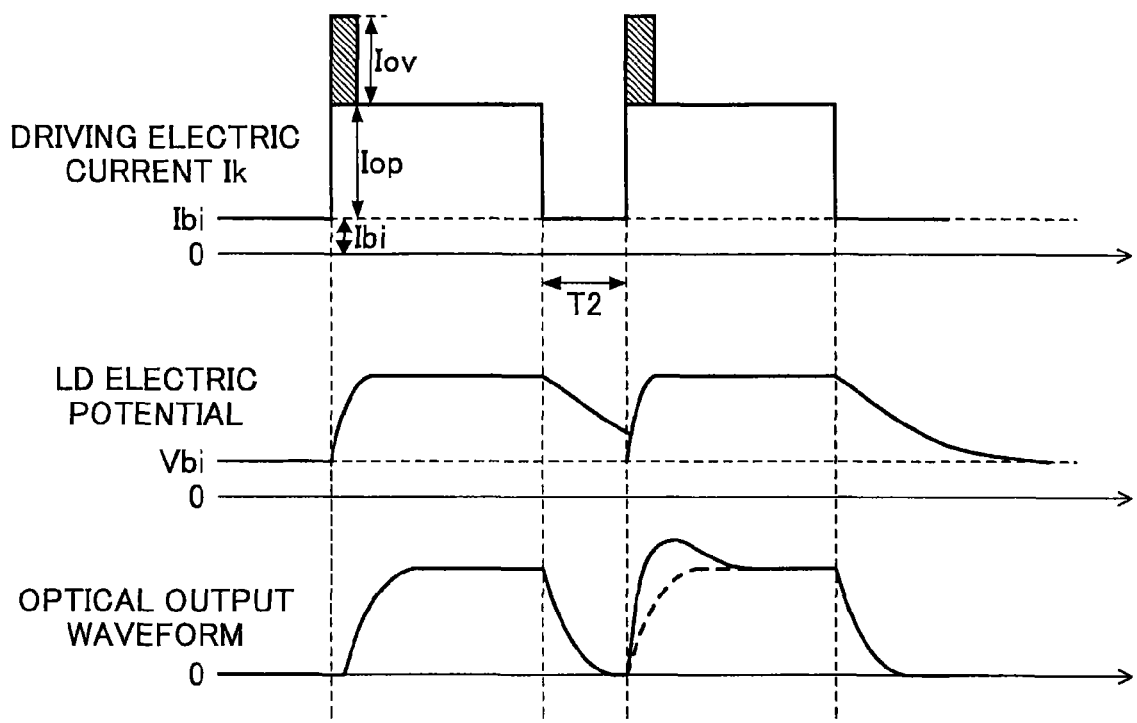

FIGS. 3A and 3B are diagrams showing an example of the driving electric current waveform and the optical output waveform when the overshoot electric current is applied to a predetermined electric current. FIG. 3A shows an example of a driving electric current Ik such that a turning-on time period of the predetermined electric current Iop and a turning-off time period of the predetermined electric current Iop are approximately the same. Here, during the turning-on time period of the predetermined electric current Iop, the predetermined electric current Iop is supplied to the light source. During the turning-off time period of the predetermined electric current Iop, the supply of the predetermined electric current Iop is stopped. FIG. 3B shows an example of the driving electric current Ik such that the turning-off time period of the predetermined electric current Iop (during which the supply of the predetermined electric current Iop to the light source is stopped) is shorter than the turning-on time period of the predetermined electric current Iop (during which the predetermined electric current Iop is supplied to the light source). Further, the driving electric current Ik shown in FIGS. 3A and 3B includes a bias electric current Ibi that is added to the predetermined electric current Iop. In this example, the turning-on time period of the predetermined electric current Iop is defined to be a time period during which the predetermined electric current Iop and the bias electric current Ibi are superposed. The turning-off time period of the predetermined electric current Iop is defined to be a time period from a moment at which a value of the driving electric current Ik becomes equal to a value of the bias electric current Ibi (i.e., the moment at which the value of the driving electric current Ik is fallen from the value corresponding to the sum of the value of the predetermined electric current Iop and the value of the bias electric current Ibi to the value of the bias electric current Ibi) until a moment at which the predetermined electric current Iop rises immediately subsequently.

Further, in the example of FIGS. 3A and 3B, it is assumed that the light source is turned off when the electric potential of the light source is fallen from the electric potential corresponding to the state where the light source is turned on to bias electric potential Vbi. The bias electric potential Vbi is electric potential of the light source when the bias electric current Ibi is supplied to the light source.

From FIG. 3A, it can be seen that during the turning-off time period T1, the electric potential of the light source decreases to the bias electric potential Vbi. Accordingly, when the predetermined electric current Iop is applied to the light source immediately subsequently, the rising edge of the optical output waveform is the same as that of the preceding waveform (the optical output waveform corresponding to the immediately previous turning-on time period).

In contrast, in FIG. 3B, the electric potential of the light source may not decrease to the bias electric potential Vbi. Consequently, in this case, the predetermined electric current Iop is supplied to the light source during a state of the optical source such that the electric potential of the light source is greater than the bias electric potential Vbi. Namely, the light source may be in a state in which light is excessively emitted. Accordingly, it is possible that optical output waveform is not a desired waveform.

As a method of overcoming such a situation, a technique can be considered such that an optical output waveform is adjusted by shortening the time period during which the electric potential decreases. Here, the time period can be shortened by superposing an undershoot electric current Iud to the predetermined electric current Iop while synchronizing the undershoot electric current Iud with the falling edge of the predetermined electric current Iop.

FIGS. 4A and 4B are diagrams showing an example of the driving electric waveform and the optical output waveform when the undershoot electric current is applied to the predetermined electric current. FIG. 4A shows an example in which the turning-off time period of the predetermined electric current Iop is longer than the turning-on time period of the predetermined electric current Iop. FIG. 4B shows an example in which the turning-on time period of the predetermined electric current Iop is approximately the same as the turning-off time period of the predetermined electric current Iop.

Each of FIGS. 4A and 4B shows two cases, and the two cases are different in a charge amount of the undershoot electric current Iud applied to the predetermined electric current at a timing of the falling edge of the predetermined electric current Iop. In each of FIGS. 4A and 4B, the solid line shows a case in which the undershoot charge amount is less than an optimum value. In each of FIGS. 4A and 4B, the dashed line shows a case in which the undershoot charge amount is greater than the optimum value.

Here, the optimum value of the undershoot charge amount is defined to be a value with which a time period for stabilizing the electric potential of the light source to a bias electric potential Vbi after application of the undershoot electric current Iud is minimized. Noted that the term "the undershoot charge amount" and the term "the value of the undershoot electric current" are used as synonyms.

It can be seen from FIG. 4A that, in each of the cases where the undershoot charge amount is less than the optimum value and the case where the undershoot charge amount is greater than the optimum value, the electric potential of the light source decreases to the bias electric potential Vbi during the turning-off time period T3. Consequently, in the example of FIG. 4A, even if the undershoot charge amount is not equal to the optimum value, the rising edge of the optical output waveform at a moment of supplying the predetermined electric current Iop to the light source for the second time is the same as that of the immediately preceding optical output waveform (i.e., the rising edge of the optical output waveform at a moment of supplying the predetermined electric current Iop to the light source for the first time).

In contrast, in the example of FIG. 4B in which the turning-off time period T4 is shorter than the turning-off time period T3 of FIG. 4A, when the undershoot charge amount is less than the optimum value, the electric potential of the light source immediately after completing application of the undershoot electric current Iud2 may not completely decrease to the bias electric voltage Vbi. Consequently, the subsequent predetermined electric current Iop is supplied to the light source, prior to the electric potential of the light source decreasing to the bias electric potential Vbi. In this case, the light source may excessively emit light. Accordingly, a response characteristic of the rising edge of the second optical waveform may not be the same as that of the first optical waveform.

In FIG. 4B, when the undershoot charge amount is greater than the optimum value, the electric potential of the light source immediately after completing application of the undershoot electric current Iud1 is less than the bias electric voltage Vbi. Consequently, when the predetermined electric current Iop is supplied to the light source for the second time, a delay time period may be spent until the light source outputs a predetermined light amount. Accordingly, a response characteristic of the rising edge of the second optical output waveform may not be the same as that of the first optical output waveform.

Hereinafter, a case is considered in which the undershoot charge amount is less than the optimum value, for example.

For FIG. 4A, a value obtained by integrating the light amount during the state in which the light source is turned on is denoted as P1a. For FIG. 4B, a value obtained by integrating the light amount during the state in which the light source is turned on is denoted as P1b. P1a and P1b satisfy the following inequality: P1a<P1b. Namely, when the undershoot charge amount is less than the optimum value, the value obtained by integrating the light amount becomes greater for the case in which the turning-off time period of the predetermined electric current Iop is the shortest compared to that of the case in which the turning-off time period of the predetermined electric current Iop is the longest, even if the turning-on time periods of the predetermined electric current Iop are the same. In other words, a total light emission amount is greater for the case in which the turning-off time period of the predetermined electric current Iop is the shortest.

Next, a case is considered in which the undershoot charge amount is greater than the optimum value. In this case, the electric potential of the light source immediately after completing application of the undershoot electric current Iud may be less than the bias electric voltage Vbi. Accordingly, the rising edge of the output waveform may be rounded.

In this case, for FIG. 4A, a value obtained by integrating the light amount during the state in which the light source is turned on is denoted as P2a, and, for FIG. 4B, a value obtained by integrating the light amount during the state in which the light source is tuned on is denoted as P2b. P2a and P2b satisfy the following inequality: P2a>P2b. Namely, when the undershoot charge amount is greater than the optimum value, the value obtained by integrating the light amount becomes greater for the case in which the turning-off time period of the predetermined electric current Iop is the longest compared to that of the case in which the turning-off time period of the predetermined electric current Iop is the shortest, even if the turning-on time periods of the predetermined electric current Iop are the same. In other words, a total light emission amount is greater for the case in which the turning-off time period of the predetermined electric current Iop is the longest.

The total light emission amount may vary depending on the turning-off time period of the predetermined electric current Iop. That is because the response characteristic of the rising edge of the optical output waveform is varied, when the subsequent turning-on time period is started while the electric potential of the light source is shifted from the electric potential of the light source immediately after applying the undershoot electric current Iud to the bias voltage Vbi.

The inventors consider that, by applying an optimum undershoot electric current Iud, a stable optical output waveform can be achieved regardless of the turning-off time period of the predetermined electric current Iop. Here, the optimum undershoot electric current Iud is such that after applying the optimum undershoot electric current Iud, the electric potential of the light source becomes approximately equal to the bias electric potential.

In this case, an undershoot time period Tud that is a time period for applying the undershoot electric current Iud may be adjusted to be shorter than the turning-off time period of the predetermined electric current Iop. That is because, when the undershoot time period Tud is longer than the turning-off time period of the predetermined electric current Iop, the undershoot electric current Iud is superposed with the rising edge of the subsequent predetermined electric current Iop, and the rising edge of the optical output waveform may be rounded.

The value of the undershoot electric current Iud can be adjusted by carefully considering a response time period of the electric potential shift of the light source. The response time period of the electric potential shift may vary depending on the parasitic capacitance of the light source and the light source driving circuit.

For example, for the case of FIG. 4A, when the predetermined electric current Iop is supplied after application of the undershoot electric current Iud, the electric potential of the light source becomes the bias electric potential Vbi regardless of the value of the undershoot electric current Iud. Accordingly, when the turning-off time period is long, such as shown in FIG. 4A, a shift of the undershoot electric current Iud may not affect the response of the rising edge of the optical output waveform. Thus, for the case of FIG. 4A, it may be difficult to optimize the undershoot electric current Iud to be an optimum undershoot electric current Iud that stabilizes the response of the rising edge.

As shown in FIG. 4B, when the turning-off time period of the predetermined electric current Iop is short, the electric potential shift of the light source caused by the undershoot electric current Iud may affect the response of the rising edge of the optical output waveform. In such a case, the value of the undershoot electric current Iud can be adjusted to be an optimum value.

In order to achieve both the method of enhancing the response of the rising edge of the optical output waveform by the overshoot electric current Iov and the method of stabilizing the response of the rising edge by the undershoot electric current Iud regardless of the turning-off time period of the predetermined electric current Iop, each of the overshoot electric current Iov and the undershoot electric current Iud may be adjusted with respect to the target optical output waveform.

According to the embodiment of the present invention, the rising edge of the optical output waveform is stabilized by using both the overshoot electric current Iov and the undershoot electric current Iud. In this manner, a desired optical output waveform can be obtained regardless of the turning-on time period and/or the turning-off time period of the predetermined electric current Iop.

Hereinafter, details of the embodiment is explained. FIG. 5 is a diagram illustrating an example of a schematic configuration of an image forming apparatus.

The image forming apparatus 10 according to this example includes an optical scanner 20, a photoreceptor 30, a writing controller 40, and a clock generating circuit 50.

The optical scanner 20 according to this example includes a polygon mirror 21, a scanning lens 22, a light source driving circuit 100, a laser diode (Laser Diode (LD), a semiconductor laser) that is a light emitter (a light source), and a photodetector (PD) that is a light-receiving element. In this example, the LD is used as the light source. However, the embodiment is not limited to this. For example, the light source may be a laser diode array (LDA), a vertical cavity surface emitting laser (VCSEL), and so forth.

A laser beam emitted from the LD is scanned by the rotating polygon mirror 21, and the laser beam is irradiated onto the photoreceptor 30 through the scanning lens 22. The photoreceptor 30 is a medium to be scanned. A light spot is formed on the photoreceptor 30 by the irradiated laser beam, thereby forming an electrostatic latent image on the photoreceptor 30. Further, the polygon mirror 21 emits a laser beam to the PD each time scanning of a single line is completed. When the laser beam is irradiated onto the PD, the PD converts the laser beam into an electric signal. Then, the PD inputs the electric signal to a phase-locked loop 41 included in the writing controller 40. When the electric signal is input to the phase-locked loop 41, the phase-locked loop 41 generates pixel clocks corresponding to subsequent single lines. The clock generating circuit 50 inputs a high-frequency clock signal to the phase-locked loop. In this manner, phase locking of the pixel clocks is achieved.

The writing controller 40 supplies a reference pulse signal to the light source driving circuit 100 in accordance with the generated pixel clocks. The writing controller 40 supplies a target light amount setting signal to the light source driving circuit 100, and thereby the writing controller 40 drives the LD. In this manner, an electrostatic latent image of image data is formed on the photoreceptor.

Figure 6:
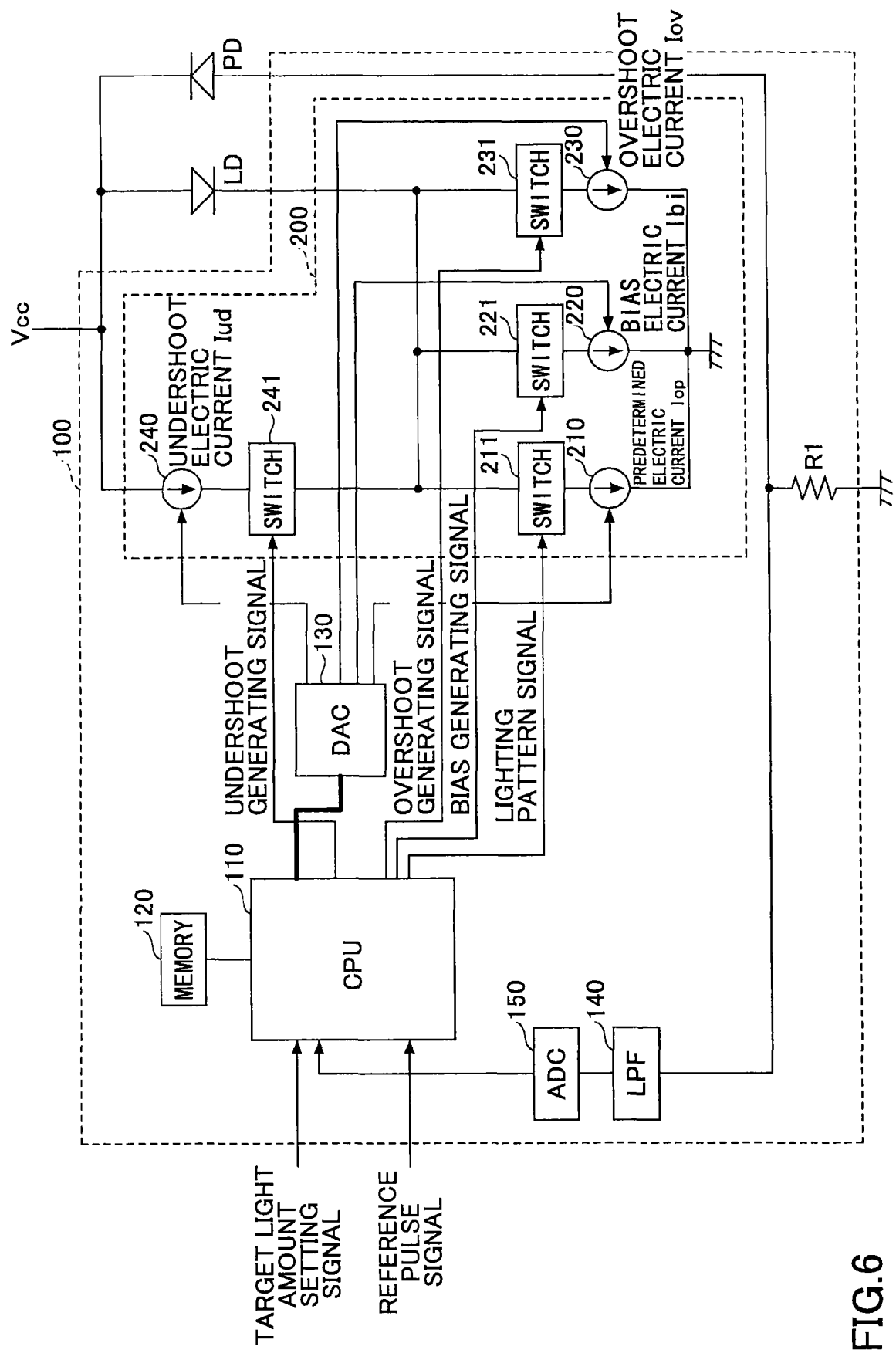
FIG. 6 is a diagram illustrating an example of a light source driving circuit.

Hereinafter the light source driving circuit 100 is explained by referring to FIG. 6. FIG. 6 is a diagram illustrating an example of the light source driving circuit 100.

The light source driving circuit 100 according to this example includes a central processing unit (CPU) 100, a memory 120, a digital-to-analog converter (DAC) 130, a low-pass filter (LPF) 140, an analog-to-digital converter (ADC) 150, an LD driver 200, and a resistor R1. The resistor R1 may not be included inside the light source driving circuit 100. In this case, the resistor R1 may be disposed outside the light source driving circuit 100.

The light source driving circuit 100 is connected to the LD and to the PD. The light source driving circuit 100 controls driving of the LD based on the electric signal that is output from the PD depending on a light amount of the LD.

The CPU 110 controls various types of operations of the light source driving circuit 100. The memory 120 stores various types of values that are used for operation of the light source driving circuit 100. Details of functions of the CPU 110 and the values stored in the memory 120 are described below.

The DAC 130 converts a signal that is output from the CPU 110 into analog values. The LPF 140 causes a signal in a predetermined band of the electric signal that is output from the PD to pass through. The ADC 150 converts the electric signal that is output from the LPF 140 into a digital value.

The LD driver 200 supplies a driving electric current to the LD based on the reference pulse signal and the target light amount setting signal, and thereby the LD driver 200 controls emission timing of the LD.

The LD driver 200 according to this example applies a predetermined current to the LD in order to drive the LD. Additionally, the LD driver 200 according to this example applies an overshoot electric current Iov and an undershoot electric current Iud to the LD. The overshoot electric current Iov is synchronized with a rising edge of the predetermined electric current. The undershoot electric current Iud is synchronized with a falling edge of the predetermined electric current.

Hereinafter, the example of the LD driver 200 is explained. The LD driver 200 according to this example includes a switching power supply 210, a bias power supply 220, an overshoot power supply 230, an undershoot power supply 240, and switches 211, 221, 231, and 241.

The switching power supply 210, the bias power supply, the overshoot power supply 230, and the undershoot power supply 240 generate a driving electric current Ik for driving the LD. The driving electric current Ik according to this example is an electric current that is obtained by adding these electric currents output from corresponding power supplies.

The switching power supply 210 generates the predetermined electric current Iop based on the lighting control signal from the CPU 110. The switching power supply 210 is connected to the LD through the switch 211. The switch 211 includes, for example, a transistor. A lighting control signal supplied from the CPU 110 causes the switch 211 to turn on or to turn off. The value of the predetermined electric current Iop is adjusted in accordance with a command from the CPU 110.

The bias power supply 220 generates a predetermined bias electric current Ibi based on a bias generating signal from the CPU 110. The bias power supply 220 is connected to the LD through the switch 221. The switch 221 includes, for example, a transistor. A bias generating signal supplied from the CPU 110 causes the switch 221 to turn on or to turn off. The value of the bias electric current Ibi is adjusted in accordance with a command from the CPU 110.

The overshoot power supply 230 generates an overshoot electric current Iov. The overshoot electric current Iov is a second auxiliary driving electric current that assists the predetermined electric current Iop at the rising edge of a pulse signal S1. The overshoot power supply 230 is connected to the LD through the switch 231. The switch 231 includes, for example, a transistor. An overshoot generating signal supplied from the CPU 110 causes the switch 231 to turn on or to turn off. In this example, the time period in which the overshoot generating signal is applied is an overshoot time period Tov. Specifically, the switch 231 according to this example is turned on during the overshoot time period Tov from the rising edge of the switching signal.

The connection between the undershoot power supply 240 and the LD is controlled by the on/off state of the switch 241. When the switch 241 is turned on, the undershoot power supply 240 supplies the undershoot electric current Iud to the LD in synchronization with the falling edge of the predetermined electric current Iop. An undershoot generating signal supplied from the CPU 110 causes the switch 241 to turn on or to turn off. Specifically, the switch 241 is turned on during a time period in which the undershoot generating signal is at a high level (which is referred to as an "undershoot time period Tud," hereinafter).

In this example, the overshoot time period Tov and the undershoot time period Tud are defined in advance.

The undershoot time period Tud according to this example is determined by a pixel clock and a pulse signal that determines the maximum turning-on time period of the predetermined electric current Iop. For example, when the maximum value of a duty ratio of the pulse signal that determines the turning-on time period in one pixel is 75%, the maximum turning-on time period of the predetermined electric current Iop is three quarters of the time period that is spent by the LD for scanning one pixel with a laser beam. Accordingly, the smallest turning-off time period of the predetermined electric current Iop may be defined to be one quarter of the time period that is spent by the LD for scanning one pixel with a laser beam. For example, when the time period that is spent by the LD for scanning one pixel with a laser beam is 10 nanoseconds, the maximum turning-on time period of the predetermined electric current is 7.5 nanoseconds, and the smallest turning-off time period is 2.5 nanoseconds. Accordingly, the undershoot time period Tud according to this example may preferably be adjusted to be shorter than the smallest turning-off time period of the predetermined electric current Iop.

Additionally, the value of the overshoot electric current Iov and the value of the undershoot electric current Iud according to this example may be dynamically adjusted.

Figure 7:
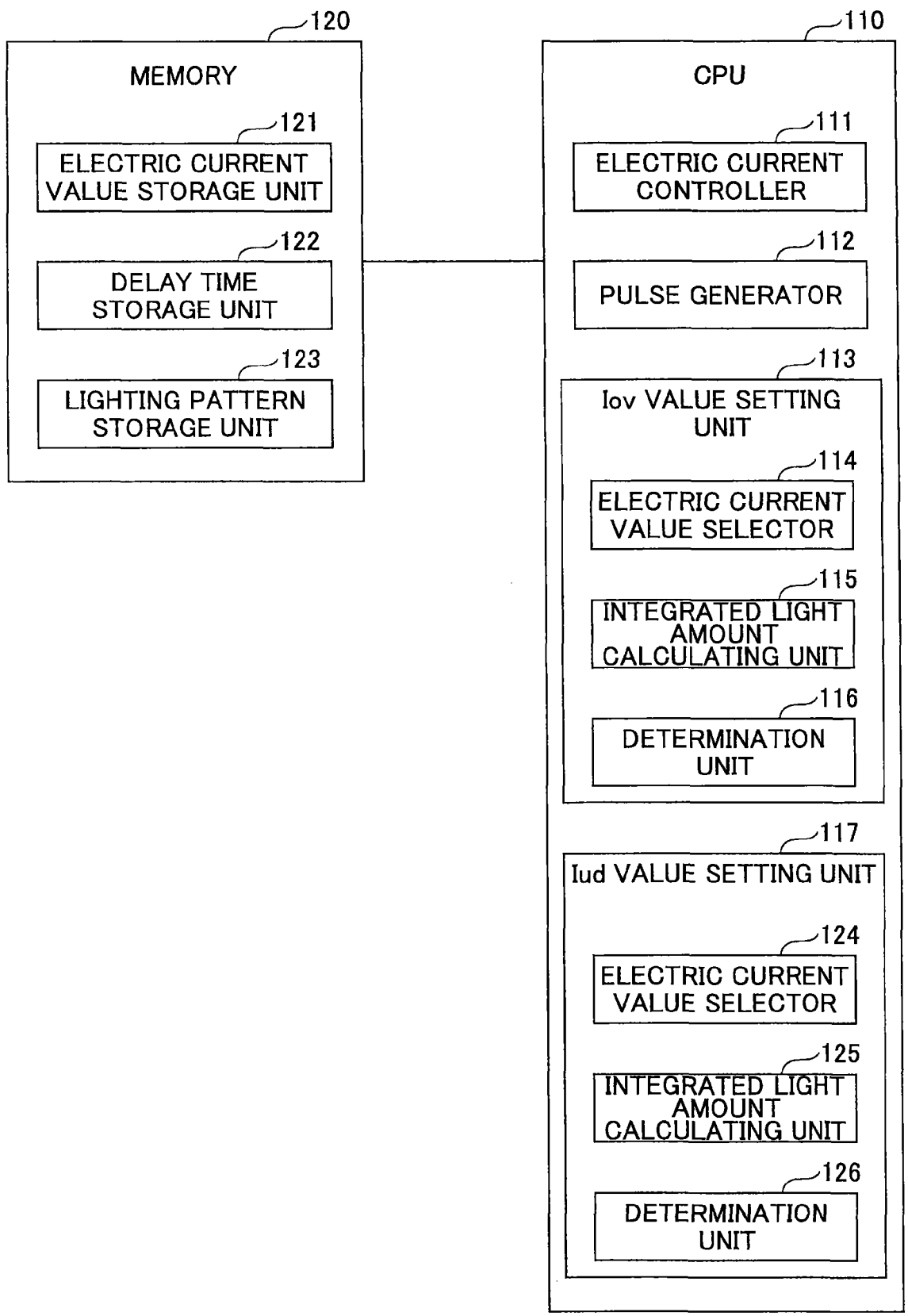
FIG. 7 is a diagram illustrating an example of a functional configuration of a CPU and values stored in a memory.

Hereinafter, the functions of the CPU 110 and the values stored in the memory 120 according to this example are explained by referring to FIG. 7. FIG. 7 is a diagram illustrating the functional configuration of the CPU 110 and the values stored in the memory 120.

The CPU 110 according to this example includes an electric current controller ill, a pulse generator 112, an Iov value setting unit 113, and an Iud value setting unit 117.

The memory 120 includes an electric current value storage unit 121, a delay time storage unit 122, and a lighting pattern storage unit 123. The electric current value storage unit 121 stores setting values for the corresponding power supplies included in the light source driving circuit 100. Specifically, the electric current value storage unit 121 stores electric current values of the predetermined electric current Iop and the bias electric current, and initial values of the overshoot electric current Iov and the undershoot electric current Iud.

The delay time storage unit 122 stores a value of delay time that is for determining the overshoot time period Tov and the undershoot time period Tud. The lighting pattern storage unit 123 stores a lighting pattern signal for lighting the LD. The lighting pattern signal is used by the Iov value setting unit 113 to adjust the value of the overshoot electric current Iov. The lighting pattern signal is also used by the Iud value setting unit 117 to adjust the value of the undershoot electric current Iud.

In the CPU 110, the electric current controller 111 retrieves the setting values of the corresponding power supplies stored in the electric current value storage unit 121. The electric current controller 111 causes the power supplies to output electric currents corresponding to the setting values through the DAC 130.

The pulse generator 112 is a signal generator that generates the overshoot generating signal and the undershoot generating signal based on the value of the delay time stored in the delay time storage unit 122 and the reference pulse signal. The pulse generator 112 may generate the bias generating signal and the lighting pattern signal. The lighting pattern signal according to this example is a signal that is supplied to the switch 211 for adjusting the value of the overshoot electric current Iov by the Iov value setting unit 113 and for adjusting the value of the undershoot electric current Iud by the Iud value setting unit 117. When the image forming apparatus 10 executes image forming operation, the lighting control signal that is based on image data supplied from the writing controller 40 controls on/off state of the switch 211.

The Iov value setting unit 113 calculates and adjusts the over shoot electric current Iov based on the output of the PD. The Iov value setting unit 113 according to this example includes an electric current value selector 114, an integrated light amount calculating unit 115, and a determination unit 116. Details of the process by the Iov value setting unit 113 are described below.

The Iud value setting unit 117 calculates and adjusts the undershoot electric current Iud based on the output of the PD. The Iud value setting unit 117 according to this example includes an electric current value selector 124, an integrated light amount calculating unit 125, and a determination unit 126. Details of the process by the Iud value setting unit 117 are described below.

Figure 8:
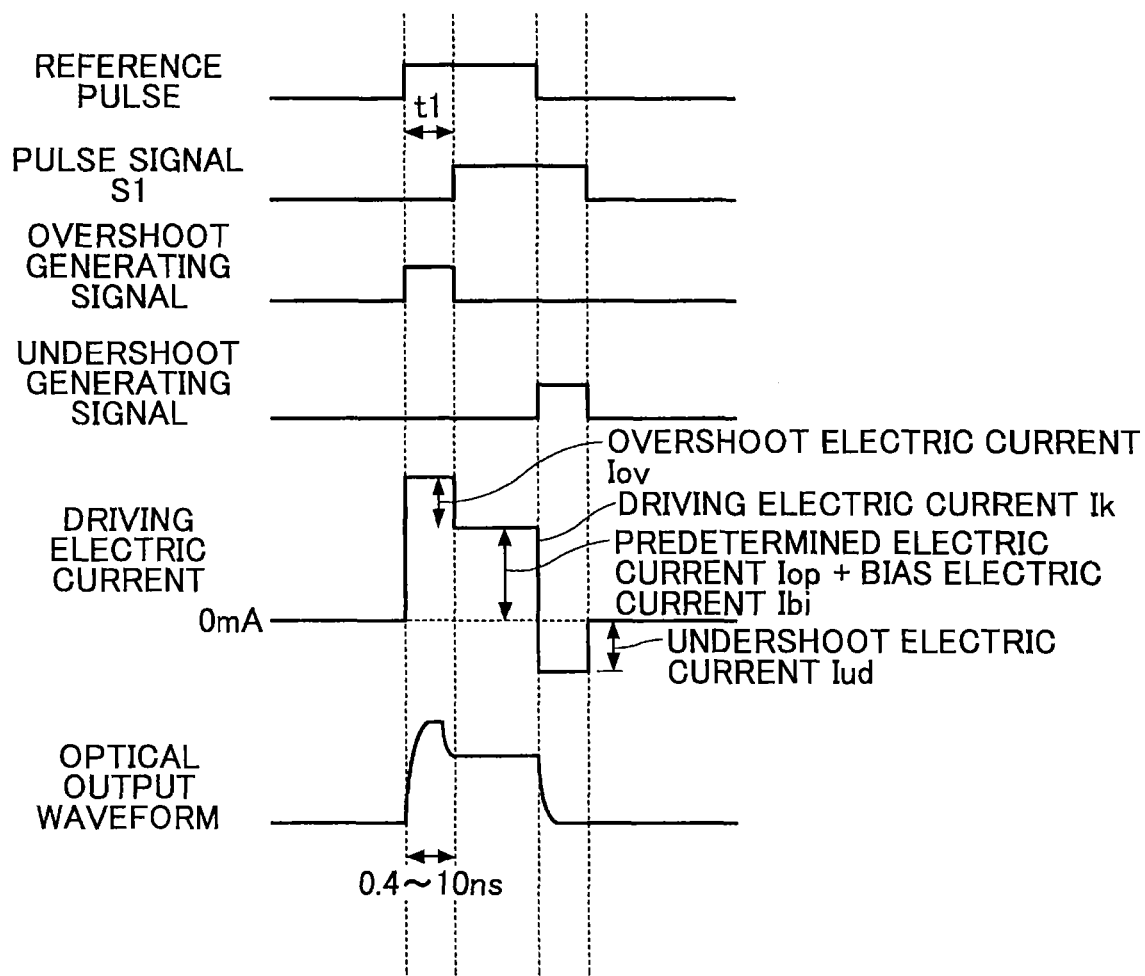
FIG. 8 is a diagram illustrating an example of an overshoot generating signal and an undershoot generating signal.

Hereinafter, generation of the overshoot generating signal and generation of the undershoot generating signal by the pulse generator 112 according to this example are explained by referring to FIG. 8. FIG. 8 is a diagram illustrating the generation of the overshoot generating signal and the generation of the undershoot generating signal.

The pulse generator 112 according to this example retrieves the value of the delay time t1 from the delay time storage unit 122, for example. The delay time t1 is a time period corresponding to the overshoot time period Tov and the undershoot time period Tud. The pulse generator 112 generates the pulse signal S1 that is obtained by delaying the reference pulse signal by the amount corresponding to the delay time t1. For example, the pulse generator 112 generates the overshoot generating signal such that, when the reference pulse signal is at a high level, and when the pulse signal S1 is at a low level, the overshoot time period Tov is turned on (i.e., the overshoot generating signal is at a high level).

In this example, it is assumed that the value of the delay time t1 is stored in the memory 120. However, the embodiment is not limited to this. The value of the delay time t1 may be obtained by a method other than the above described method. The pulse generator 112 may generate the pulse signal S1 by using an inverter sequence or a buffer sequence. Further, in the embodiment, a reference pulse signal may be delayed by a low-pass filter that is formed of a resistor and a capacitor, and then the waveform of the signal may be shaped. This waveform shaped signal may be used as the pulse signal S1. In both cases, the amount of the delay can be easily varied by changing the number of elements or by changing the filter coefficient.

In this case, the overshoot time period Tov (the delay time t1) during which the overshoot electric current Iov is applied may preferably be adjusted in a range from 0.4 nanoseconds to 0.5 nanoseconds, for example. By considering the characteristics of the LD and the sensitivity characteristics of the photoreceptor, the overshoot time period Tov may be adjusted to be a time period with which the tone reproducibility is optimized.

Figure 9:
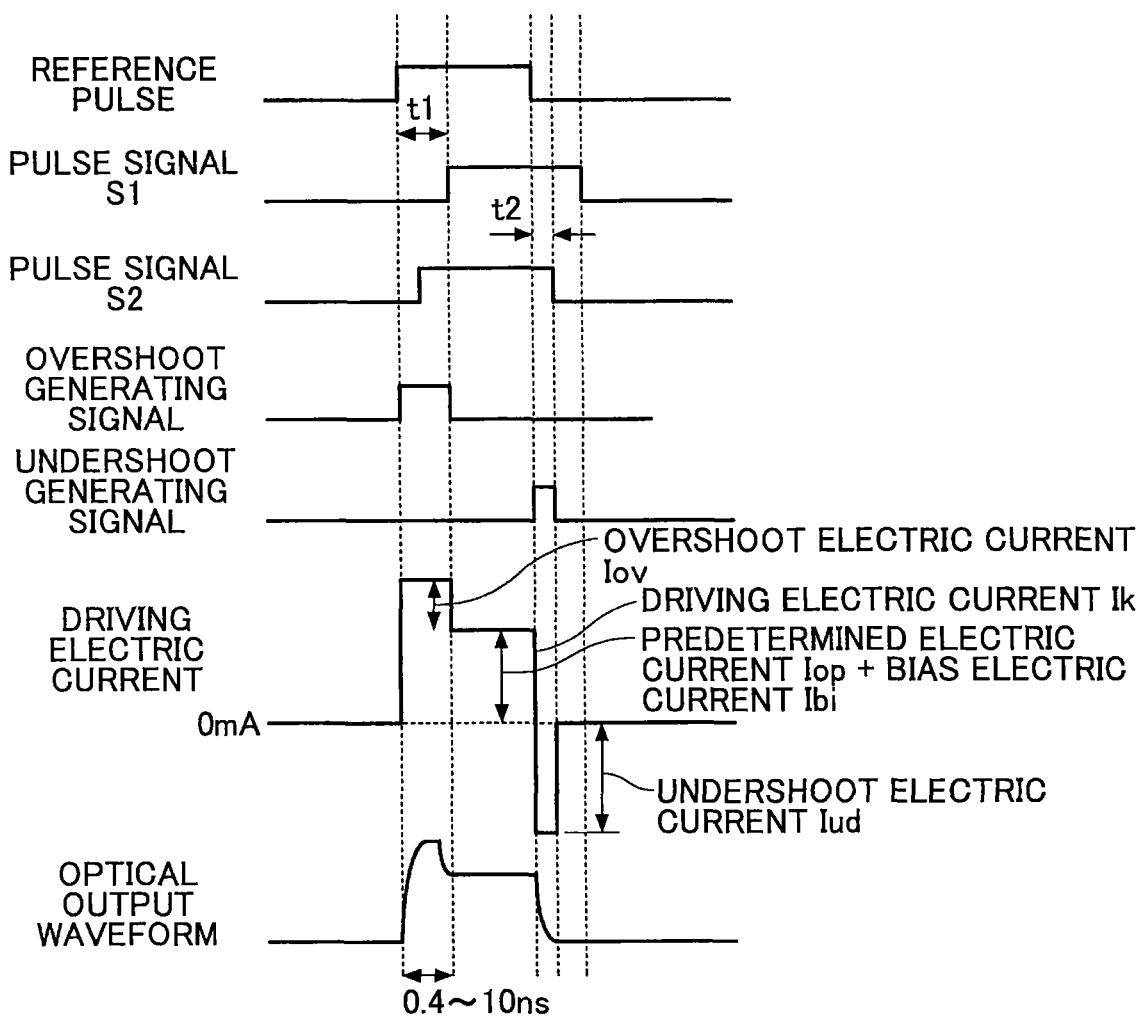
FIG. 9 is a diagram illustrating another example of the overshoot generating signal and the undershoot generating signal.

FIG. 9 is another diagram illustrating the generation of the overshoot generating signal and the generation of the undershoot generating signal.

FIG. 9 shows an example case in which the pulse generator 112 differentiates the overshoot electric current Iov from the undershoot electric current Iud by using two delay time periods t1 and t2.

In the example of FIG. 9, the pulse generator 112 retrieves the values of the delay time periods t1 and t2 from the delay time storage unit 122, for example. The delay time period t1 is a time period corresponding to the overshoot time period Tov, and the delay time period t2 is a time period corresponding to the undershoot time period Tud. The pulse generator 112 generates a pulse signal S1 by delaying the reference pulse signal by an amount corresponding to the delay time period t1. The pulse generator 112 also generates a pulse signal S2 by delaying the reference pulse signal by an amount corresponding to the delay time period t2. For example, the pulse generator 112 generates the undershoot generating signal such that, when the reference pulse signal is at a low level, and when the pulse signal S2 is at a high level, the undershoot time period Tud is turned on (i.e., the under shoot generating signal is at a high level).

In the embodiment, by setting a plurality of delay time periods in the plurality of delay time storage units 122 as described above, each of the overshoot time period Tov and the undershoot time period Tud can be changed depending on necessity.

Figure 10:
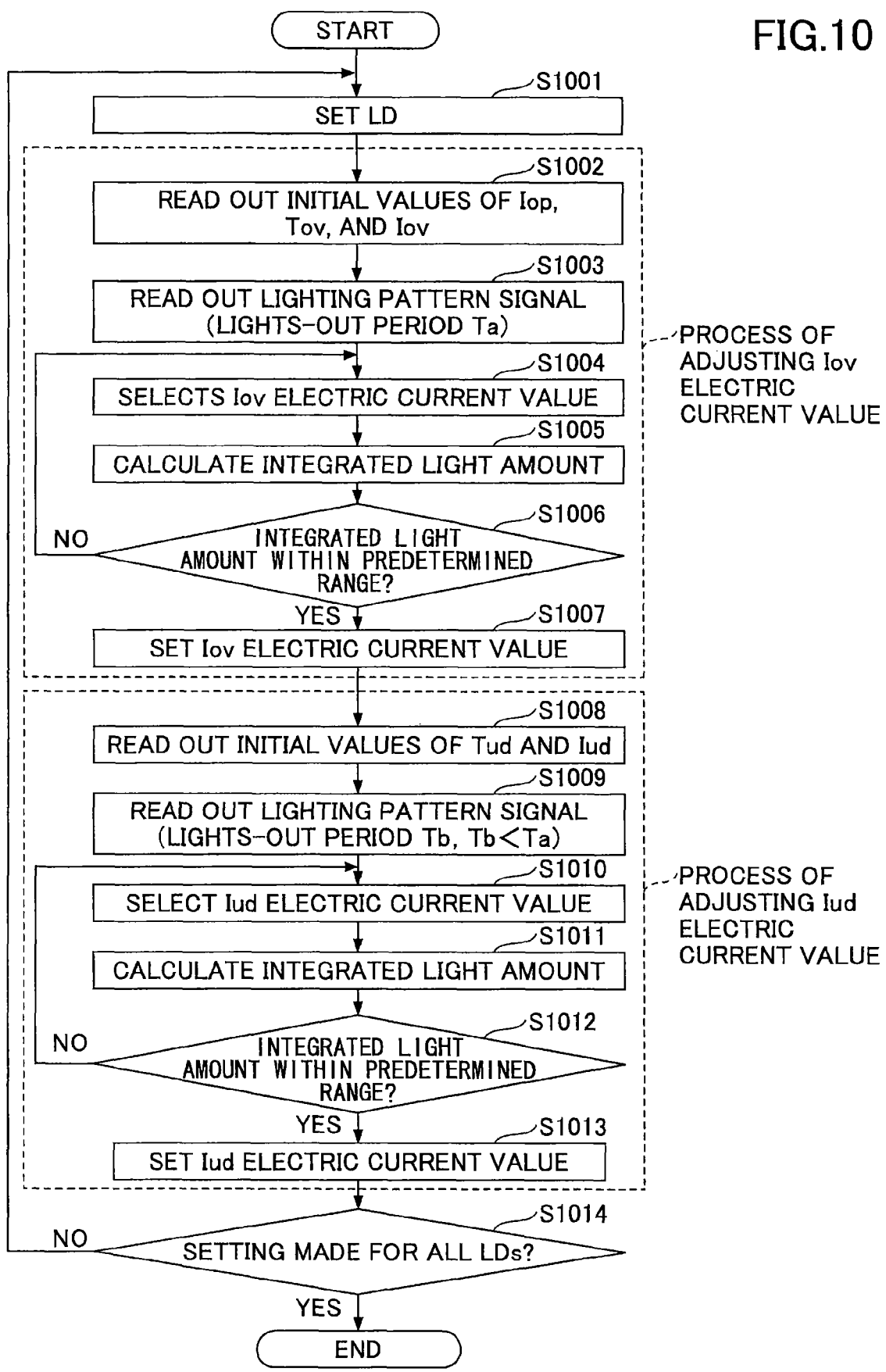
FIG. 10 is a flowchart illustrating an example of operation of a CPU of the light source driving circuit.

Hereinafter, operation of an example of the CPU 110 is explained by referring to FIG. 10. FIG. 10 is a flow chart illustrating the operation of the example of the CPU 110 included in the light source driving circuit 100.

When a command for setting the value of the overshoot electric current Iov and the value of the undershoot electric current Iud is received, the CPU 110 according to this example selects an LD to which the electric current values are to be set (step S1001). In this example, the command for setting may be received, for example, at a moment of activating the image forming apparatus 10 from a sleep mode, or at a moment of closing a door disposed on the housing of the image forming apparatus 10 after the door was opened.

Subsequently, the CPU 110 executes a process of adjusting the value of the overshoot electric current Iov by using the Iov value setting unit 113. The Iov value setting unit 113 reads out the value of the predetermined electric current Iop and the initial value of the overshoot electric current Iov from the electric current value storage unit 121 of the memory 120. Further, the Iov value setting unit 113 reads out the overshoot time period Tov from the delay time storage unit 122 (step S1002).

Subsequently, the Iov value setting unit 113 reads out the lighting pattern signal from the lighting pattern storage unit 123 of the memory 120 (step S1003). The lighting pattern signal is supplied to the switch 211. The lighting pattern signal according to this example is a signal that is generated in advance, so that it can control on/off of the driving current Ik to be supplied to the LD corresponding to a plurality of pixels, for example. Specifically, when the lighting pattern signal is at a high level (which is denoted by "H level," hereinafter), the predetermined electric current Iop is applied to the LD. When the lighting pattern signal is at a low level (which is denoted by "L level," hereinafter), application of the predetermined electric current Iop to the LD is stopped. Namely, the lighting pattern signal is a signal that defines the turning-on time period and the turning-off time period of the predetermined electric current Iop that is applied to the LD. Further, for setting the value of the overshoot electric current Iov, the turning-off time period of the predetermined electric current Iop is denoted as Ta.

Subsequently, the Iov value setting unit 113 outputs an electric current value selection signal for selecting the electric current value to the DAC 130 by using the electric current value selector 114 (step S1004). The electric current value selector 114 selects the electric current values in an ascending order among the electric current values that can be output by the DAC 130.

When the electric current value selection signal is received from the CPU 110, the DAC 130 converts the selected electric current value into an analog value, and the DAC 130 outputs the analog value to the overshoot power supply 230. The overshoot power supply 230 supplies the selected electric current value to the LD. At this time, the overshoot generating signal is supplied to the switch 231 in synchronization with the rising edge of the lighting pattern signal. This overshoot generating signal turns on the switch 231 during the overshoot time period Tov that is defined in advance.

Subsequently, the Iov value setting unit 113 calculates an integrated light amount value of the output waveform of the PD by using the integrated light amount calculating unit 115 (step S1005).

Subsequently, the Iov value setting unit 113 determines, by using the determination unit 116, whether the integrated light amount of the output waveform of the PD is within a predetermined range (Step S1006). Details of the determination of the integrated light amount by the determination unit 116 are described below. When a determination is made at step S1006 that the integrated light amount is within the predetermined range, the Iov value setting unit 113 sets the electric current value selected at this time as the overshoot electric current Iov (step S1007). When a determination is made at step S1006 that the integrated light amount is out of the predetermined range (S1006: NO), the Iov value setting unit 113 returns to step S1004, and the Iov value setting unit 113 selects an electric current value that is the second electric current value in the ascending order.

The process of adjusting the overshoot electric current Iov is described above. In this example, after the overshoot electric current Iov is set, the value of the undershoot electric current Iud is adjusted by using the lighting pattern signal such that a lights-out time period of the LD becomes shorter than that of the lighting pattern at the time of setting the overshoot electric current Iov.

The CPU 110 according to this example executes a process of adjusting the value of the undershoot electric current Iud by using the Iud value setting unit 117. The Iud value setting unit 117 according to this example reads out the undershoot time period Tud and the initial value of the undershoot electric current Iud from the electric current value storage unit 121 of the memory 120 (step S1008).

Subsequently, the Iud value setting unit 117 reads out the lighting pattern signal from the lighting pattern storage unit 123 of the memory 120 (step S1009). The Iud value setting unit 117 according to this example selects and reads out a lighting pattern signal, so that the following inequality is satisfied: Ta>Tb. Here, the time period for turning-off the LD by the read lighting pattern signal is denoted by Tb. Details of the lighting pattern signal are described below.

Subsequently, the Iud value setting unit 117 outputs an electric current value selection signal for selecting the electric current value to the DAC 130 by using the electric current value selector 124 (step S1010). The electric current value selector 124 selects the electric current values in a descending order among the electric current values that can be output by the DAC 130. Here, the electric current having a large value means that the electric current's absolute value is large.

When the electric current value selection signal is received from the CPU 110, the DAC 130 converts the selected electric current value into an analog value, and the DAC 130 outputs the analog value to the undershoot power supply 240. The undershoot power supply 240 supplies the selected electric current value to the LD. At this time, the undershoot generating signal is supplied to the switch 241 in synchronization with the rising edge of the lighting pattern signal. This undershoot generating signal turns on the switch 241 during the undershoot time period Tud that is defined in advance.

Subsequently, the Iud value setting unit 117 calculates an integrated light amount value of the output waveform of the PD by using the integrated light amount calculating unit 125 (step S1011).

Subsequently, the Iud value setting unit 117 determines, by using the determination unit 126, whether the integrated light amount of the output waveform of the PD is within a predetermined range (step S1012). When a determination is made at step S1012 that the integrated light amount is within the predetermined range (S1012: YES), the Iud value setting unit 117 sets the electric current value that is selected at this time as the overshoot electric current Iud (step S1013). When a determination is made at step S1012 that the integrated light amount is out of the predetermined range (S1012: NO), the Iud value setting unit 117 returns to step S1010, and the Iud value setting unit 117 selects an electric current value that is the second electric current value in the descending order.

Subsequently, the CPU 110 according to this example determines whether the value of the overshoot electric current Iov and the value of the undershoot electric current Iud are set for all the LDs (step S1014). When a determination is made at step S1014 that the values of the electric currents are not set for all the LDs (S1014: NO), the CPU 110 returns to step S1001. When a determination is made at step S1014 that the value of the electric currents are set for all the LDs (S1014: YES), the CPU 110 terminates the process.

Figure 11:
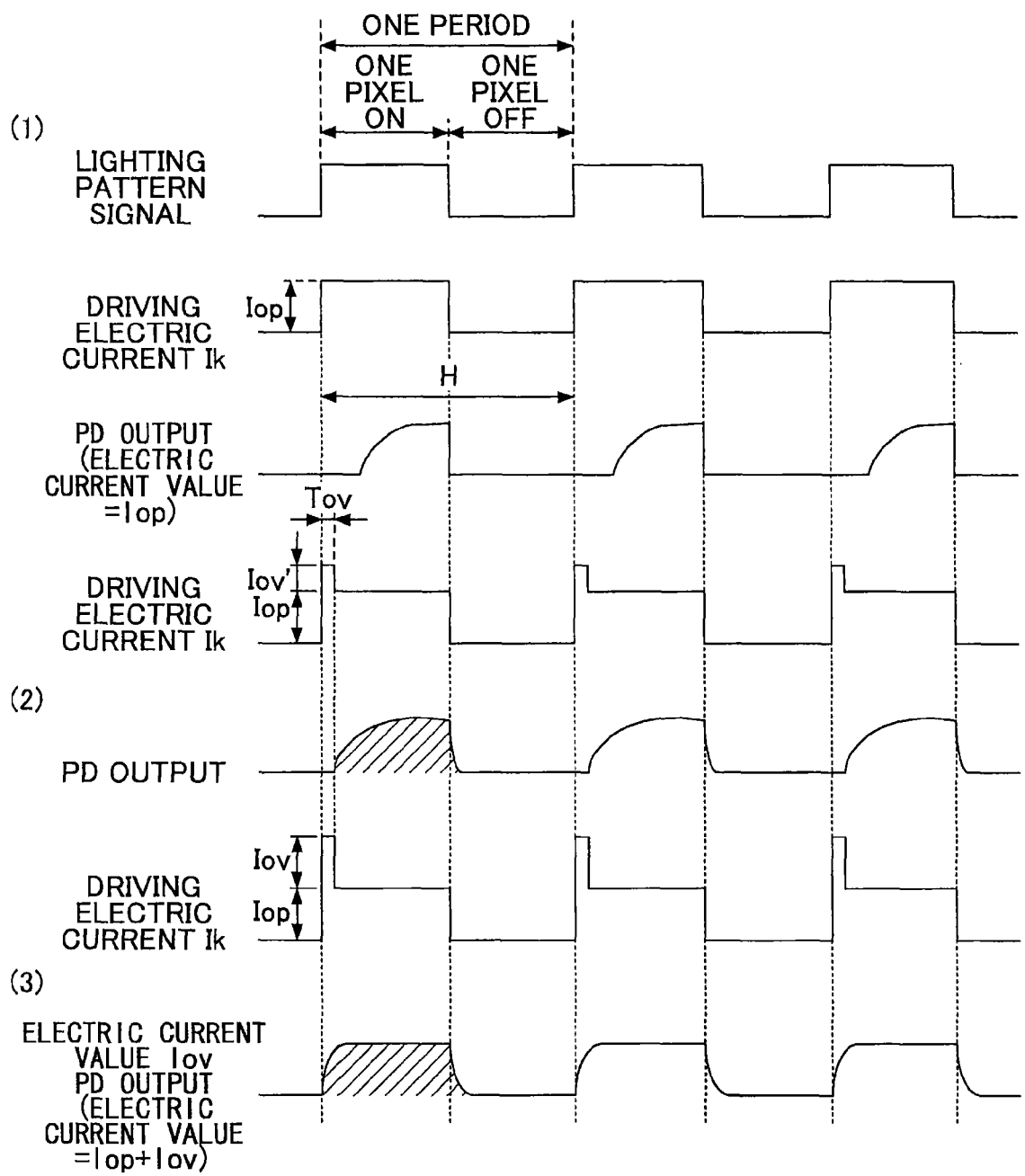
FIG. 11 is a diagram illustrating an example of determination of an integrated light amount.

Hereinafter, the determination of the integrated light amount is explained. FIG. 11 is a diagram illustrating the determination of the integrated light amount.

In FIG. 11, a case is shown in which the predetermined range of the integrated light amount is set to be greater than or equal to 48% and less than 52%, so that the output waveform of the PD becomes closer to the ideal waveform without the emission delay. Further, FIG. 11 is an example of the determination of the integrated light amount for setting the value of the overshoot electric current Iov.

FIG. 11, (1) shows the output waveform of the PD, when the value of the overshoot electric current Iov is not selected by the electric current value selector 114, and when the driving electric current Ik is the predetermined electric current Iop that is in synchronization with the lighting pattern signal. In this case, the integrated light amount of the output waveform of the PD over a period H that corresponds to one period of the lighting pattern signal is less than 48%.

FIG. 11, (2) shows the output waveform of the PD, when the electric current value Iov' that is the initial value of the overshoot electric current Iov is applied by the electric current value selector 114. In this case, the driving electric current Ik is overshot by the amount of the electric current value Iov' during the overshoot time period Tov from the rising edge. The integrated light amount of the output waveform of the PD over the period H corresponding to one period of the lighting pattern signal is also less than 48%.

FIG. 11, (3) shows the output waveform of the PD, when the electric current value that is greater than the electric current value Iov' is selected by the electric current value selector 114. In this case, the driving electric current Ik is overshot by the amount of the electric current value Iov during the overshoot time period Tov from the rising edge. The integrated light amount of the output waveform of the PD over the period H corresponding to the one period of the lighting pattern signal is 50%. Accordingly, the Iov value setting unit 113 sets the electric current value Iov as the value of the overshoot electric current.

The CPU 110 according to this example makes a similar determination for setting the value of the undershoot electric current Iud. When the value of the undershoot electric current Iud is to be set, the value of the overshoot electric current Iov is already set. Accordingly, the integrated light amount calculating unit 125 calculates the integrated light amount of the output waveform of the PD for the case in which the electric current value Iud' that is the initial value of the undershoot electric current Iud is added to the driving electric current Ik including the overshoot electric current Iov.

Subsequently, the electric current value selector 124 selects the electric current value Iud that is greater than the electric current value Iud'. The driving electric current Ik is undershot by the amount of the electric current value Iud during the undershoot time period Tud from the rising edge. The determination unit 126 may determine whether the result of integrating the output waveform of the PD at this time is within the predetermined range. Here, the predetermined range may be suitably set depending on the characteristics and the like of the device that uses the LD.

Figure 12:
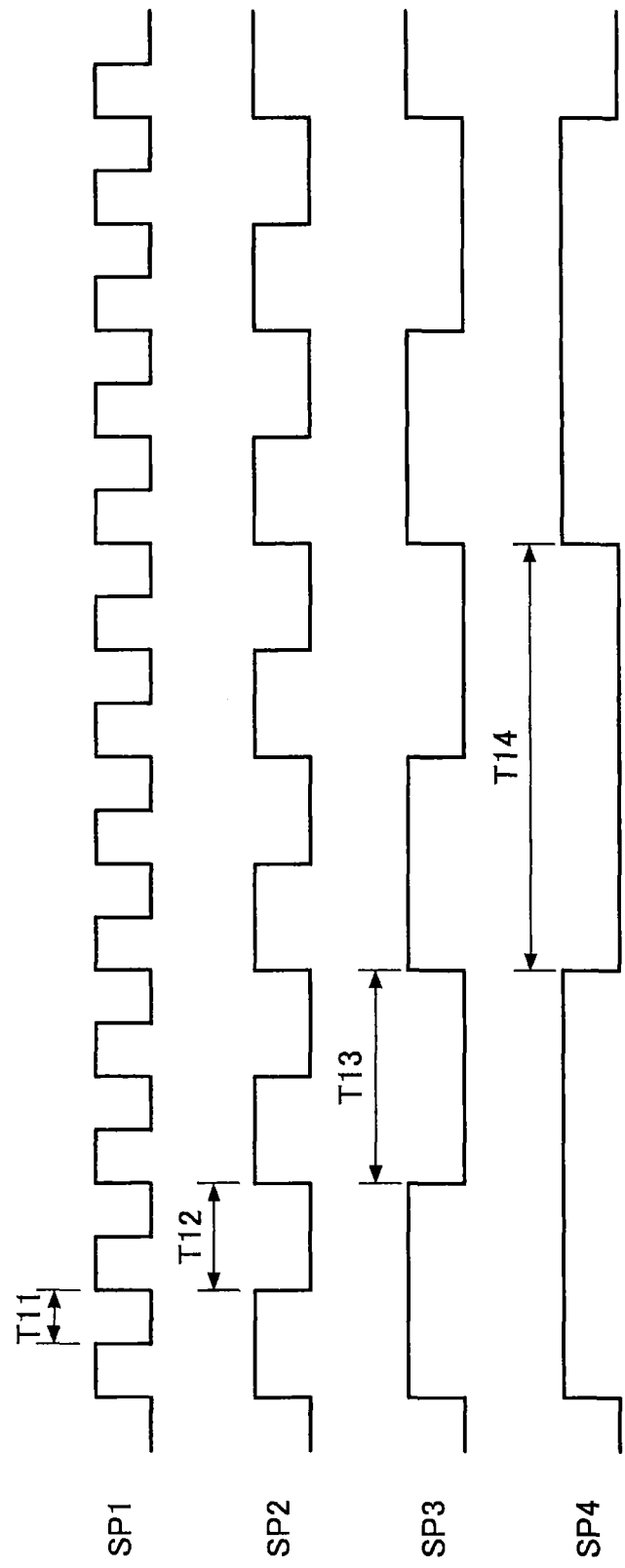
FIG. 12 is a diagram illustrating an example of a lighting pattern signal.

Hereinafter, the lighting pattern signal according to this example is explained. FIG. 12 is a diagram illustrating the lighting pattern signal.

The lighting pattern signal SP1 shown in FIG. 12 is a signal generated in advance such that the predetermined electric current Iop is caused to be turned on for the amount corresponding to one pixel, and the predetermined electric current Iop is caused to be turned off for the amount corresponding to one pixel. The time period T11 in which the lighting pattern signal SP1 is at the L level is the turning-off time period of the predetermined electric current Iop by the lighting pattern signal SP1. In the explanation below, the lighting pattern signal that causes the predetermined electric current Iop to be turned on for the amount corresponding to the n pixels and that causes the predetermined electric current Iop to be turned off for the amount corresponding to the m pixels is referred to as a "nbym signal."

The lighting pattern signal SP2 is a 2by2 signal. When the overshoot electric current Iov is adjusted by the lighting pattern signal SP2, the time period T12 in which the lighting pattern signal SP2 is at the L level is the turning-off time period of the predetermined electric current Iop by the lighting pattern signal SP2. Similarly, the time period T13 in which the lighting pattern signal SP3 is at the L level is the turning-off time period of the predetermined electric current Iop by the lighting pattern signal SP3, and the time period T14 in which the lighting pattern signal SP4 is at the L level is the turning-off time period of the predetermined electric current Iop by the lighting pattern signal SP4.

The lighting pattern signal SP3 is a 4by4 signal, and the lighting pattern signal SP4 is a 8by8 signal. In other words, the period of the lighting pattern signal is such that the period of the lighting pattern signal SP1 is the shortest, and the period of the lighting pattern signal SP4 is the longest.

In this example, the turning-off time period of the predetermined electric current Iop for adjusting the undershoot electric current Iud is set to be shorter than the turning-off time period of the predetermined electric current Iop for setting the value of the overshoot electric current Iov. In other words, in this example, the value of the undershoot electric current Iud is set by using the lighting pattern signal having the period that is less than the period of the lighting pattern signal that is used for setting the value of the overshoot electric current Iov.

For example, when the value of the overshoot electric current Iov is set by using the lighting pattern signal SP4, any one of the lighting pattern signals SP1 to SP3, each of which has the period that is less than the period of the lighting pattern signal SP4, may be selected for adjusting the value of the undershoot electric current Iud.

The lighting pattern signals SP1 to SP4 shown in FIG. 12 are signals that cause the turning-on time period and the turning-off time period of the predetermined electric current Iop to be equal to each other. Accordingly, when the optical output waveform is obtained as a waveform of an ideal rectangular wave, the integrated light amount is 50%. In this case, the predetermined range that is used for the determination by the determination unit 116 and the determination unit 126 may be set to be a range around the 50%.

Figure 13:
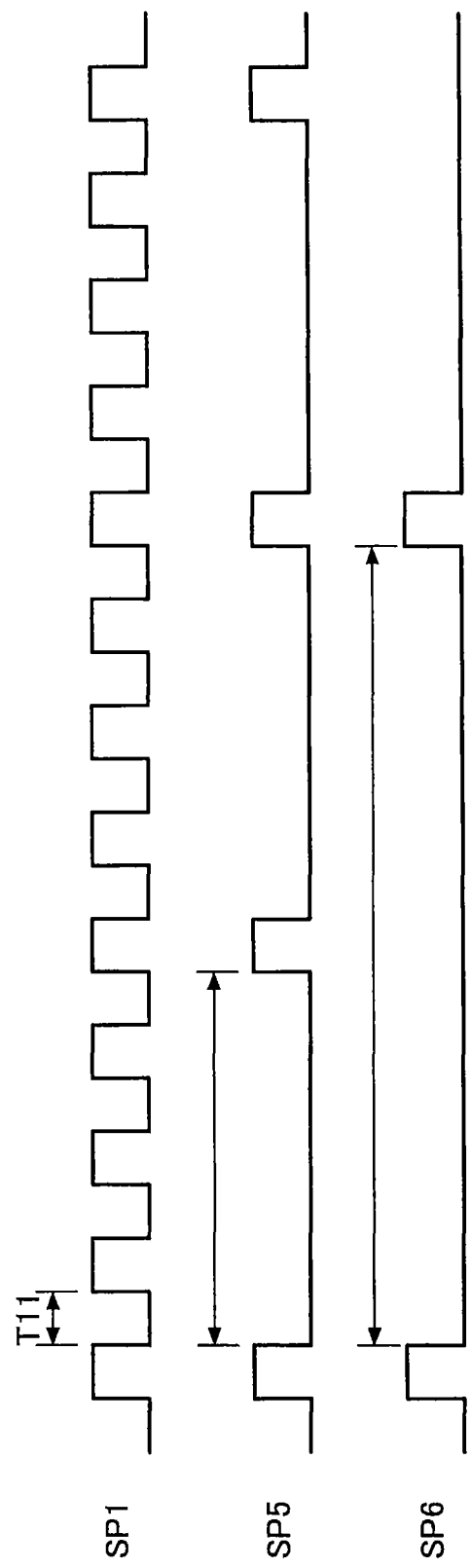
FIG. 13 is a diagram illustrating another example of the light pattern signal.

FIG. 13 is a diagram illustrating another example of the lighting pattern signal. Each of the lighting pattern signals SP5 and SP6 shown in FIG. 13 is a signal such that turning-off time period is caused to be longer then the turning-on time period of the predetermined electric current Iop, and the turning-on time period is caused to be equal to the time period for the LD to scan the amount corresponding to one pixel. The lighting pattern signal SP5 is a 1by3 signal, and the lighting pattern signal SP6 is a 1by7 signal.

In this example, the lighting pattern signal SP5 of the lighting pattern signal SP6 may be used for setting the value of the overshoot electric current Iov, and the lighting pattern signal SP1 may be used for setting the value of the undershoot electric current Iud, for example.

Each of the lighting pattern signals SP5 and SP6 shown in FIG. 13 is a signal such that the turning-on time period is short with respect to one period. Accordingly, for example, for the 1by3 signal, when the integrated light amount for a case in which the PD outputs the target light amount is set to be 100%, the ideal integrated light amount is 25%. Further, for the 1by7 signal, the ideal integrated light amount is 12.5%, which is small.

In this example, the lighting pattern signals shown in FIG. 13 may be used for adjusting the value of the overshoot electric current Iov and the value of the undershoot electric current value Iud.

However, for the nbym (n=m) signal shown in FIG. 12, as the turning-off time period of the predetermined electric current Iop becomes longer, a ratio that the overshoot electric current Iov contributes to the integrated light amount becomes smaller, thereby lowering the accuracy of adjustment. In contrast, for the 1bym signal shown in FIG. 13, a ratio of the overshoot electric current Iov with respect to one pixel is invariant, and only the level that is to be detected is lowered. Accordingly, the accuracy of adjustment of the overshoot electric current Iov may be improved. It may be considered based on the detection accuracy of the PD as to which lighting pattern signal is used for adjusting the value of the overshoot electric current Iov and the value of the undershoot electric current Iud.

Figure 14:
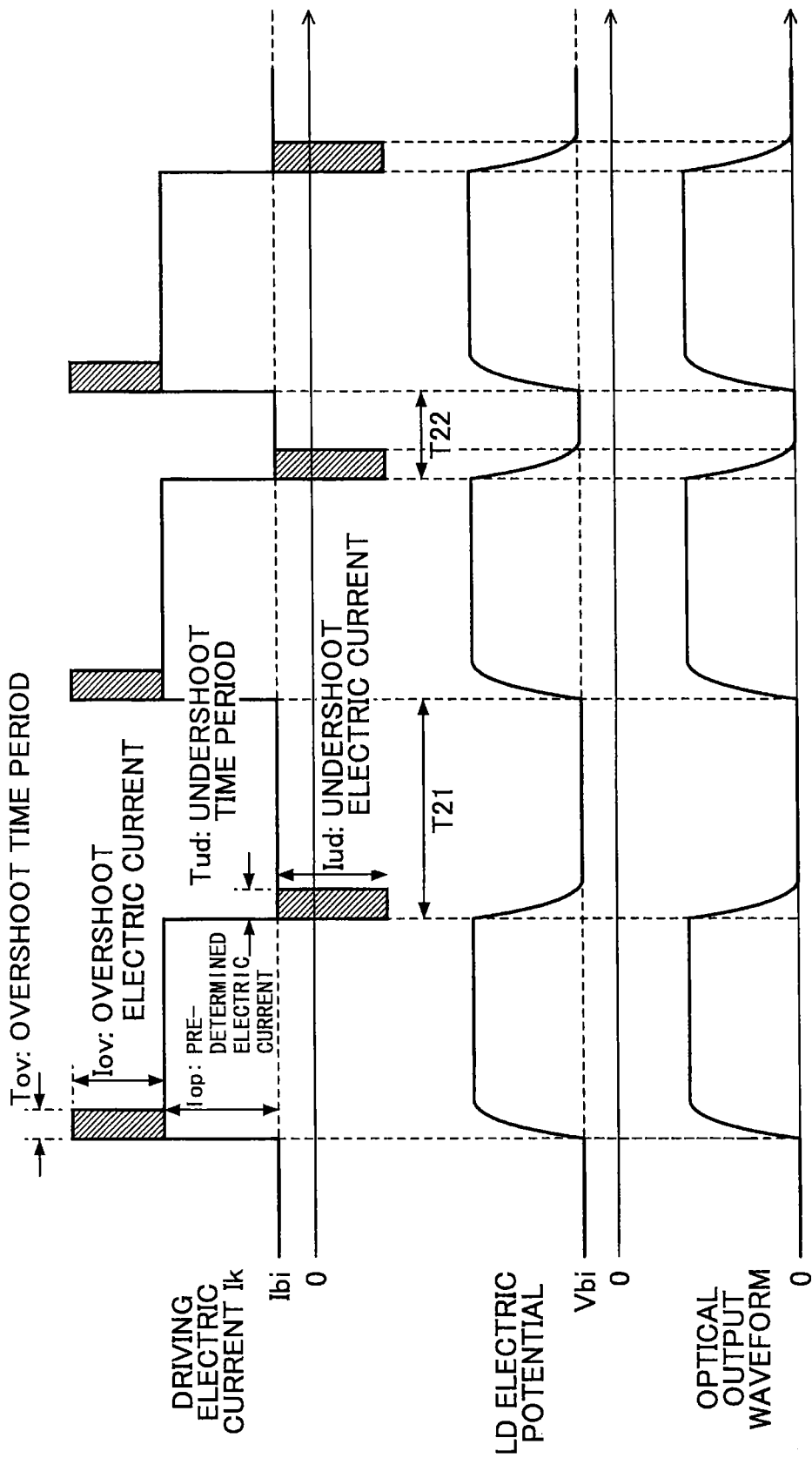
FIG. 14 is a diagram showing an example of a driving electric current, electric potential of the light source, and the optical output waveform.

FIG. 14 is a diagram showing an example of the driving electric current, an example of the electric potential, and an example of the optical output waveform.

FIG. 14 shows the driving electric current Ik, the electric potential of the LD, and the optical output waveform of the PD, when the turning-off time period is set to be T21; and the driving current Ik, the electric potential of the LD, and the optical output waveform of the PD, when the turning-off time period is set to be T22.

In FIG. 14, both in the turning-off time periods T21 and T22, the electric potential of the LD becomes the bias electric potential Vbi at a timing at which the undershoot time period Tud elapsed and the application of the undershoot electric current Iud is stopped.

Accordingly, for the optical output waveform, the same response characteristics can be obtained at the rising edge and at the falling edge in both the turning-off time periods T21 and T22. Therefore, a stable optical output waveform can be obtained regardless of the turning-off time period of the predetermined electric current Iop.

Hereinafter, another example is explained by referring to the accompanying drawings. This example is different from the previous example only in a point that the value of the overshoot electric current Iov is set for all the LDs. Accordingly, in the following explanation of the example, only the point that is different from the previous example is explained. An element having the same functional configuration as that of the previous example is denoted by the same reference numeral that is used for the explanation of the previous example, and thereby the explanation of the element is omitted.

FIG. 15 is a flowchart illustrating an example of operation of the CPU 110 according to this example.

The process from step S1501 to step S1507 of FIG. 15 is the same as the process from step S1001 to step S1007 of FIG. 10. Accordingly, the explanation of the process from step S1501 to step S1507 is omitted. When the value of the overshoot electric current Iov is set at step S1507, the CPU 110 determines whether the values of the overshoot electric current Iov are determined for all the LDs included in the light source driving circuit 100 (step S1508).

When a determination is made at step S1508 that the values of the overshoot electric current Iov are not set for all the LDs (S1506: NO), the CPU 110 returns to step S1501. When a determination is made at step S1508 that the values of the overshoot electric current Iov are set for all the LDs (S1506: YES), the CPU 110 proceeds to step S1509 described below.

The process from step S1509 to step S1515 of FIG. 15 is the same as the process from step S1008 to step S1013 of FIG. 10. Thus, the explanation of the process from step S1509 to step S1515 is omitted.

When the value of the undershoot electric current Iud is set at step S1515, the CPU 110 determines whether the values of the undershoot electric current Iud are determined for all the LDs (step S1516). When a determination is made at step S1516 that the values of the undershoot electric current value Iud are not set for all the LDs (S1516: NO), the CPU 110 returns to step S1509. When a determination is made at step S1516 that the values of the undershoot electric current value Iud are determined for all the LDs (S1516: YES), the CPU 110 terminates the process.

As described above, in this example, the values of the undershoot electric current Iud may be adjusted after the values of the Iov are set for all the LDs.

Hereinabove, the light source driving circuit, the optical scanning device, and the image forming apparatus are explained by the embodiment. However, the present invention is not limited to the specifically disclosed embodiment, and variations and modifications may be made without departing from the scope of the present invention. Specific examples of numerical values are used in order to facilitate understanding of the invention. However, these numerical values are simply illustrative, and any other appropriate values may be used, except as indicated otherwise. The separations of the sections of the specification are not essential to the present invention. Depending on necessity, subject matter described in two or more sections may be combined and used, and subject matter described in a section may be applied to subject matter described in another section (provided that they do not contradict). A boundary of a functional unit or a processing unit in a functional block may not correspond to a boundary of a physical component. An operation by a plurality of functional units may be physically executed by a single component. Alternatively, an operation by a single functional unit may be physically executed by a plurality of components.

For the convenience of explanation, the devices according to the embodiment of the present invention are explained by using the functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present application is based on and claims the benefit of priority of Japanese priority application No. 2013-107034 filed on May 21, 2013, the entire contents of which are hereby incorporated herein by reference.

What is claimed is:

1. A light source driving circuit configured to drive a light source, the light source driving circuit comprising:
    a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current; and
    a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source,
    wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

2. The light source driving circuit according to claim 1, wherein the driving electric current generator is configured to generate the driving electric current that includes a bias electric current, and
    wherein the bias electric current is superposed with the predetermined electric current, the first auxiliary driving electric current, and the second auxiliary driving electric current.

3. The light source driving circuit according to claim 1, further comprising:
    a photoreceptor configured to receive light emitted from the light source, and configured to output a signal having an amplitude corresponding to the received light amount;
    an integrator configured to integrate a signal waveform that is output from the photoreceptor;
    a first electric current value setting unit configured to set the first value of the first auxiliary driving electric current;
    a second electric current value setting unit configured to set the second value of the second auxiliary driving electric current; and
    a lighting pattern storage unit configured to store the first lighting pattern signal and the second lighting pattern signal,
    wherein the first electric current value setting unit includes
    a first electric current value selector configured to select a first electric current value that is applied to the predetermined electric current while being synchronized with the rising edge of the predetermined electric current, and
    a first determination unit configured to determine, when a first addition electric current obtained by adding the first auxiliary driving electric current to the predetermined electric current is supplied to the light source, whether a first integrated value of the signal waveform of the photoreceptor is within a predetermined range,
    wherein, when the first integrated value is within the predetermined range, the first electric current setting unit is configured to set the first electric current value as the first value of the first auxiliary driving electric current, and
    wherein the second electric current value setting unit includes a second electric current value selector configured to select a second electric current value that is applied to the predetermined electric current while being synchronized with the falling edge of the predetermined electric current, and
    a second determination unit configured to determine, when a second addition electric current obtained by adding the first auxiliary driving current and the second electric current value to the predetermined electric current is supplied to the light source, whether a second integrated value of the signal waveform of the photoreceptor is within the predetermined range,
    wherein, when the second integrated value is within the predetermined range, the second electric current value setting unit is configured to set the second electric current value as the second value of the second auxiliary driving electric current.

4. The light source driving circuit according to claim 3, wherein the second electric current value setting unit is configured to set the second value of the second auxiliary driving electric current, so that an electric potential of the light source after application of the second auxiliary driving electric current is equal to the electric potential of the light source at a moment of stopping the supply of the predetermined electric current.

5. An optical scanning device comprising:
    a light source;
    a reflection mirror configured to scan a light beam emitted from the light source; and
    a light source driving circuit configured to drive the light source,
    wherein the light source driving circuit includes
    a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current, and
    a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source, wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

6. The optical scanning device according to claim 5,
wherein each of the first lighting pattern signal and the second lighting pattern signal is a signal such that a pattern is repeated, wherein, in the pattern, a time period for supplying the predetermined electric current is equal to a time period for stopping the supply of the predetermined electric current, and
wherein the time period for supplying the predetermined electric current corresponds to a time period for the light beam emitted from the light source to scan a width corresponding to one pixel.

7. The optical scanning device according to claim 5,
wherein each of the first lighting pattern signal and the second lighting pattern signal is a signal such that a pattern is repeated, wherein, in the pattern, a time period for supplying the predetermined electric current is not equal to a time period for stopping the supply of the predetermined electric current,
wherein the time period for supplying the predetermined electric current corresponds to a time period for the light beam emitted from the light source to scan a width corresponding to one pixel, and
wherein the time period for stopping the supply of the predetermined electric current corresponds to a time period for the light beam emitted from the light source to scan a width corresponding to a plurality of pixels.

8. The optical scanning device according to claim 5,
wherein the light source is a vertical cavity surface emitting laser.

9. An image forming apparatus comprising:
a light source;
a reflection mirror configured to reflect a light beam emitted from the light source;
a photoreceptor configured to be scanned by the light beam reflected by the reflection mirror, and
a light source driving circuit configured to drive the light source,
wherein the light source driving circuit includes
a driving electric current generator configured to generate a driving electric current including a predetermined electric current, a first auxiliary driving electric current, and a second auxiliary driving electric current, wherein the predetermined electric current is for obtaining a predetermined light amount from the light source, the first auxiliary driving electric current is applied to the predetermined electric current while being synchronized with a rising edge of the predetermined electric current, and the second auxiliary driving electric current is applied to the predetermined electric current while being synchronized with a falling edge of the predetermined electric current, and
a controller configured to set a first value of the first auxiliary driving electric current by using a first lighting pattern signal, and configured to set a second value of the second auxiliary driving electric current by using a second lighting pattern signal, wherein each of the first lighting pattern signal and the second lighting pattern signal is for controlling supply of the predetermined electric current to the light source,
wherein, after setting the first value of the first auxiliary driving electric current, the second value of the second auxiliary driving electric current is set by using the second lighting pattern signal that defines a second time period for stopping supply of the predetermined electric current to be shorter than a first time period for stopping the supply of the predetermined electric current that is defined by the first lighting pattern signal.

* * * * *